(12) United States Patent
Robinson et al.

(10) Patent No.: US 11,796,828 B2
(45) Date of Patent: Oct. 24, 2023

(54) CONTROL OF REFLECTIONS OF A DISPLAY DEVICE

(71) Applicant: RealD Spark, LLC, Boulder, CO (US)

(72) Inventors: Michael G. Robinson, Boulder, CO (US); Graham J. Woodgate, Henley-on-Thames (GB)

(73) Assignee: RealD Spark, LLC, Boulder, CO (US)

( * ) Notice: Subject to any disclaimer, the term of this patent is extended or adjusted under 35 U.S.C. 154(b) by 199 days.

(21) Appl. No.: 17/114,098

(22) Filed: Dec. 7, 2020

(65) Prior Publication Data

US 2021/0191139 A1  Jun. 24, 2021

Related U.S. Application Data

(60) Provisional application No. 62/946,297, filed on Dec. 10, 2019.

(51) Int. Cl.
*G02B 27/28* (2006.01)
*B60R 1/00* (2022.01)
*B60K 35/00* (2006.01)

(52) U.S. Cl.
CPC ............ *G02B 27/286* (2013.01); *B60K 35/00* (2013.01); *B60R 1/001* (2013.01); *B60K 2370/37* (2019.05)

(58) Field of Classification Search
CPC .. G02B 27/246; B60K 35/00; B60K 2370/37; B60R 1/001
USPC .......................................................... 359/246
See application file for complete search history.

(56) References Cited

U.S. PATENT DOCUMENTS

| | | | |
|---|---|---|---|
| 3,914,022 A | 10/1975 | Kashnow | |
| 4,059,916 A | 11/1977 | Tachihara et al. | |
| 4,586,790 A | 5/1986 | Umeda et al. | |
| 4,621,898 A | 11/1986 | Cohen | |
| 4,974,941 A | 12/1990 | Gibbons et al. | |
| 5,005,108 A | 4/1991 | Pristash et al. | |

(Continued)

FOREIGN PATENT DOCUMENTS

| | | |
|---|---|---|
| CA | 2222313 A1 | 6/1998 |
| CN | 1125943 C | 10/2003 |

(Continued)

OTHER PUBLICATIONS

CN201880042320.X Notification of the First Office Action dated May 25, 2021.

(Continued)

*Primary Examiner* — Joseph P Martinez
*Assistant Examiner* — Grant A Gagnon
(74) *Attorney, Agent, or Firm* — Penny L. Lowry

(57) ABSTRACT

Reflections from a display device are controlled using retarders arranged on the output side of a display panel which outputs light with a predetermined polarization state. First and second planes of incidence are defined in respect of first and second rays of light output from the device and first and second normals to first and second surfaces of optically transmissive material at first and second points at which the first and second rays of light are reflected. The retarders are selected to cause the polarization state of the first ray to be linearly polarized in a direction that is in the first plane of incidence, and to cause the polarization state of the second ray to be linearly polarized in a direction that is in the second plane of incidence. The reflections from the surfaces are minimized because for both surfaces the polarization direction is in-plane.

23 Claims, 16 Drawing Sheets

(56) References Cited

U.S. PATENT DOCUMENTS

| | | |
|---|---|---|
| 5,035,491 A | 7/1991 | Kawagishi et al. |
| 5,126,882 A | 6/1992 | Oe et al. |
| 5,608,550 A | 3/1997 | Epstein et al. |
| 5,658,490 A | 8/1997 | Sharp et al. |
| 5,671,994 A | 9/1997 | Tai et al. |
| 5,715,028 A | 2/1998 | Abileah et al. |
| 5,779,337 A | 7/1998 | Saito et al. |
| 5,791,757 A | 8/1998 | O'Neil et al. |
| 5,808,784 A | 9/1998 | Ando et al. |
| 5,835,166 A | 11/1998 | Hall et al. |
| 5,852,509 A | 12/1998 | Coleman |
| 5,854,872 A | 12/1998 | Tai |
| 5,894,361 A | 4/1999 | Yamazaki et al. |
| 5,914,760 A | 6/1999 | Daiku |
| 5,997,148 A | 12/1999 | Ohkawa |
| 6,055,103 A | 4/2000 | Woodgate et al. |
| 6,099,758 A | 8/2000 | Verrall et al. |
| 6,144,433 A | 11/2000 | Tillin et al. |
| 6,169,589 B1 | 1/2001 | Kaneko |
| 6,204,904 B1 | 3/2001 | Tillin et al. |
| 6,222,672 B1 | 4/2001 | Towler et al. |
| 6,280,043 B1 | 8/2001 | Ohkawa |
| 6,364,497 B1 | 4/2002 | Park et al. |
| 6,379,016 B1 | 4/2002 | Boyd et al. |
| 6,392,727 B1 | 5/2002 | Larson et al. |
| 6,437,915 B2 | 8/2002 | Moseley et al. |
| 6,731,355 B2 | 5/2004 | Miyashita |
| 6,752,505 B2 | 6/2004 | Parker et al. |
| 6,987,550 B2 | 1/2006 | Takato et al. |
| 7,067,985 B2 | 6/2006 | Adachi |
| 7,072,096 B2 | 7/2006 | Holman et al. |
| 7,163,319 B2 | 1/2007 | Kuo et al. |
| 7,227,602 B2 | 6/2007 | Jeon et al. |
| 7,366,392 B2 | 4/2008 | Honma et al. |
| 7,524,542 B2 | 4/2009 | Kim et al. |
| 7,528,893 B2 | 5/2009 | Schultz et al. |
| 7,528,913 B2 | 5/2009 | Kobayashi |
| 7,633,586 B2 | 12/2009 | Winlow et al. |
| 7,660,047 B1 | 2/2010 | Travis et al. |
| 7,766,534 B2 | 8/2010 | Iwasaki |
| 7,834,834 B2 | 11/2010 | Takatani et al. |
| 7,970,246 B2 | 6/2011 | Travis et al. |
| 7,991,257 B1 | 8/2011 | Coleman |
| 8,070,346 B2 | 12/2011 | Maeda et al. |
| 8,098,350 B2 | 1/2012 | Sakai et al. |
| 8,154,686 B2 | 4/2012 | Mather et al. |
| 8,228,476 B2 | 7/2012 | Shibazaki |
| 8,237,876 B2 | 8/2012 | Tan et al. |
| 8,249,408 B2 | 8/2012 | Coleman |
| 8,262,271 B2 | 9/2012 | Tillin et al. |
| 8,469,575 B2 | 6/2013 | Weber et al. |
| 8,646,931 B2 | 2/2014 | Choi et al. |
| 8,801,260 B2 | 8/2014 | Urano et al. |
| 8,848,132 B2 | 9/2014 | O'Neill et al. |
| 8,939,595 B2 | 1/2015 | Choi et al. |
| 8,973,149 B2 | 3/2015 | Buck |
| 9,195,087 B2 | 11/2015 | Terashima |
| 9,274,260 B2 | 3/2016 | Urano et al. |
| 9,304,241 B2 | 4/2016 | Wang et al. |
| 9,324,234 B2 | 4/2016 | Ricci et al. |
| 9,448,355 B2 | 9/2016 | Urano et al. |
| 9,501,036 B2 | 11/2016 | Kang et al. |
| 9,519,153 B2 | 12/2016 | Robinson et al. |
| 9,541,698 B2 | 1/2017 | Wheatley et al. |
| 9,798,169 B2 | 10/2017 | Su et al. |
| 10,054,732 B2 | 8/2018 | Robinson et al. |
| 10,067,726 B2 | 9/2018 | Wakamoto et al. |
| 10,126,575 B1 | 11/2018 | Robinson et al. |
| 10,146,093 B2 | 12/2018 | Sakai et al. |
| 10,216,018 B2 | 2/2019 | Fang et al. |
| 10,288,914 B2 | 5/2019 | Chung et al. |
| 10,303,030 B2 | 5/2019 | Robinson et al. |
| 10,401,638 B2 | 9/2019 | Robinson et al. |
| 10,424,232 B2 | 9/2019 | Schubert et al. |
| 10,488,705 B2 | 11/2019 | Xu et al. |
| 10,527,775 B2 | 1/2020 | Yang et al. |
| 10,627,670 B2 | 4/2020 | Robinson et al. |
| 10,649,248 B1 | 5/2020 | Jiang et al. |
| 10,649,259 B2 | 5/2020 | Lee et al. |
| 10,712,608 B2 | 7/2020 | Robinson et al. |
| 10,802,356 B2 | 10/2020 | Harrold et al. |
| 10,935,714 B2 | 3/2021 | Woodgate et al. |
| 10,948,648 B2 | 3/2021 | Ihas et al. |
| 10,976,578 B2 | 4/2021 | Robinson et al. |
| 11,016,341 B2 | 5/2021 | Robinson et al. |
| 11,070,791 B2 | 7/2021 | Woodgate et al. |
| 11,079,645 B2 | 8/2021 | Harrold et al. |
| 11,079,646 B2 | 8/2021 | Robinson et al. |
| 11,092,851 B2 | 8/2021 | Robinson et al. |
| 11,099,433 B2 | 8/2021 | Robinson et al. |
| 11,099,448 B2 | 8/2021 | Woodgate et al. |
| 11,237,417 B2 | 2/2022 | Woodgate et al. |
| 11,327,358 B2 | 5/2022 | Robinson et al. |
| 11,366,358 B2 | 6/2022 | Wu et al. |
| 11,442,316 B2 | 9/2022 | Woodgate et al. |
| 2001/0024561 A1 | 9/2001 | Cornelissen et al. |
| 2002/0015300 A1 | 2/2002 | Katsu et al. |
| 2002/0024529 A1 | 2/2002 | Miller et al. |
| 2002/0171793 A1 | 11/2002 | Sharp et al. |
| 2003/0030764 A1 | 2/2003 | Lee |
| 2003/0058381 A1 | 3/2003 | Shinohara et al. |
| 2003/0089956 A1 | 5/2003 | Allen et al. |
| 2003/0107686 A1 | 6/2003 | Sato et al. |
| 2003/0117792 A1 | 6/2003 | Kunimochi et al. |
| 2003/0169499 A1 | 9/2003 | Bourdelais et al. |
| 2003/0214615 A1 | 11/2003 | Colgan et al. |
| 2003/0222857 A1 | 12/2003 | Abileah |
| 2004/0015729 A1 | 1/2004 | Elms et al. |
| 2004/0100598 A1 | 5/2004 | Adachi et al. |
| 2004/0125430 A1 | 7/2004 | Kasajima et al. |
| 2004/0141107 A1 | 7/2004 | Jones |
| 2004/0145703 A1 | 7/2004 | O'Connor et al. |
| 2004/0223094 A1 | 11/2004 | Hamada et al. |
| 2004/0240777 A1 | 12/2004 | Woodgate et al. |
| 2004/0264910 A1 | 12/2004 | Suzuki et al. |
| 2005/0002174 A1 | 1/2005 | Min et al. |
| 2005/0111100 A1 | 5/2005 | Mather et al. |
| 2005/0117186 A1 | 6/2005 | Li et al. |
| 2005/0135116 A1 | 6/2005 | Epstein et al. |
| 2005/0157225 A1 | 7/2005 | Toyooka et al. |
| 2005/0190326 A1 | 9/2005 | Jeon et al. |
| 2005/0190329 A1 | 9/2005 | Okumura |
| 2005/0213348 A1 | 9/2005 | Parikka et al. |
| 2005/0219693 A1 | 10/2005 | Hartkop et al. |
| 2005/0243265 A1 | 11/2005 | Winlow et al. |
| 2005/0259205 A1 | 11/2005 | Sharp et al. |
| 2005/0270798 A1 | 12/2005 | Lee et al. |
| 2006/0066785 A1 | 3/2006 | Moriya |
| 2006/0082702 A1 | 4/2006 | Jacobs et al. |
| 2006/0098296 A1 | 5/2006 | Woodgate et al. |
| 2006/0146405 A1 | 7/2006 | MacMaster |
| 2006/0203162 A1 | 9/2006 | Ito et al. |
| 2006/0215244 A1 | 9/2006 | Yosha et al. |
| 2006/0244884 A1 | 11/2006 | Jeon et al. |
| 2006/0262255 A1 | 11/2006 | Wang et al. |
| 2006/0262258 A1 | 11/2006 | Wang et al. |
| 2006/0262558 A1 | 11/2006 | Cornelissen |
| 2006/0268207 A1 | 11/2006 | Tan et al. |
| 2006/0285040 A1 | 12/2006 | Kobayashi |
| 2007/0008471 A1 | 1/2007 | Wang et al. |
| 2007/0024970 A1 | 2/2007 | Lub et al. |
| 2007/0030240 A1 | 2/2007 | Sumiyoshi et al. |
| 2007/0035964 A1 | 2/2007 | Olczak |
| 2007/0047254 A1 | 3/2007 | Schardt et al. |
| 2007/0064163 A1 | 3/2007 | Tan et al. |
| 2007/0076406 A1 | 4/2007 | Kodama et al. |
| 2007/0139772 A1 | 6/2007 | Wang |
| 2007/0223251 A1 | 9/2007 | Liao |
| 2007/0268427 A1 | 11/2007 | Uehara |
| 2007/0285775 A1 | 12/2007 | Lesage et al. |
| 2008/0008434 A1 | 1/2008 | Lee et al. |
| 2008/0068329 A1 | 3/2008 | Shestak et al. |
| 2008/0068862 A1 | 3/2008 | Shimura |
| 2008/0129899 A1 | 6/2008 | Sharp |

(56) References Cited

U.S. PATENT DOCUMENTS

| | | |
|---|---|---|
| 2008/0158491 A1 | 7/2008 | Zhu et al. |
| 2008/0158912 A1 | 7/2008 | Chang et al. |
| 2008/0205066 A1 | 8/2008 | Ohta et al. |
| 2008/0285310 A1 | 11/2008 | Aylward et al. |
| 2008/0316198 A1 | 12/2008 | Fukushima et al. |
| 2009/0009894 A1 | 1/2009 | Chuang |
| 2009/0040426 A1 | 2/2009 | Mather et al. |
| 2009/0085894 A1 | 4/2009 | Gandhi et al. |
| 2009/0086509 A1 | 4/2009 | Omori et al. |
| 2009/0109381 A1 | 4/2009 | Haruyama |
| 2009/0109703 A1 | 4/2009 | Chen et al. |
| 2009/0128735 A1 | 5/2009 | Larson et al. |
| 2009/0128746 A1 | 5/2009 | Kean et al. |
| 2009/0135623 A1 | 5/2009 | Kunimochi |
| 2009/0174843 A1 | 7/2009 | Sakai et al. |
| 2009/0213147 A1 | 8/2009 | Sagardoyburu et al. |
| 2009/0213298 A1 | 8/2009 | Mimura et al. |
| 2009/0213305 A1 | 8/2009 | Ohmuro et al. |
| 2009/0244415 A1 | 10/2009 | Ide |
| 2010/0002296 A1 | 1/2010 | Choi et al. |
| 2010/0014313 A1 | 1/2010 | Tillin et al. |
| 2010/0066960 A1 | 3/2010 | Smith et al. |
| 2010/0128200 A1 | 5/2010 | Morishita et al. |
| 2010/0149459 A1 | 6/2010 | Yabuta et al. |
| 2010/0177113 A1 | 7/2010 | Gay et al. |
| 2010/0187704 A1 | 7/2010 | Hsu et al. |
| 2010/0205667 A1 | 8/2010 | Anderson et al. |
| 2010/0214324 A1 | 8/2010 | Broughton et al. |
| 2010/0238376 A1 | 9/2010 | Sakai et al. |
| 2010/0283930 A1 | 11/2010 | Park et al. |
| 2010/0289989 A1 | 11/2010 | Adachi et al. |
| 2010/0295755 A1 | 11/2010 | Broughton et al. |
| 2010/0328438 A1 | 12/2010 | Ohyama et al. |
| 2011/0018860 A1 | 1/2011 | Parry-Jones et al. |
| 2011/0032483 A1 | 2/2011 | Hruska et al. |
| 2011/0176089 A1 | 7/2011 | Ishikawa et al. |
| 2011/0241573 A1 | 10/2011 | Tsai et al. |
| 2011/0241983 A1 | 10/2011 | Chang |
| 2011/0255304 A1 | 10/2011 | Kinoshita |
| 2011/0286222 A1 | 11/2011 | Coleman |
| 2011/0321143 A1 | 12/2011 | Angaluri et al. |
| 2012/0002121 A1 | 1/2012 | Pirs et al. |
| 2012/0020078 A1 | 1/2012 | Chang |
| 2012/0086875 A1 | 4/2012 | Yokota |
| 2012/0120351 A1 | 5/2012 | Kawata |
| 2012/0127573 A1 | 5/2012 | Robinson et al. |
| 2012/0147026 A1 | 6/2012 | Gass et al. |
| 2012/0147280 A1 | 6/2012 | Osterman et al. |
| 2012/0170315 A1 | 7/2012 | Fan et al. |
| 2012/0188792 A1 | 7/2012 | Matsumoto et al. |
| 2012/0212414 A1 | 8/2012 | Osterhout et al. |
| 2012/0235891 A1 | 9/2012 | Nishitani et al. |
| 2012/0294037 A1 | 11/2012 | Holman et al. |
| 2012/0299913 A1 | 11/2012 | Robinson et al. |
| 2012/0314145 A1 | 12/2012 | Robinson |
| 2012/0320311 A1 | 12/2012 | Gotou et al. |
| 2012/0327101 A1 | 12/2012 | Blixt et al. |
| 2013/0039062 A1 | 2/2013 | Vinther et al. |
| 2013/0057807 A1 | 3/2013 | Goto et al. |
| 2013/0100097 A1 | 4/2013 | Martin |
| 2013/0107174 A1 | 5/2013 | Yun et al. |
| 2013/0120817 A1 | 5/2013 | Yoon et al. |
| 2013/0128165 A1 | 5/2013 | Lee et al. |
| 2013/0242231 A1 | 9/2013 | Kurata et al. |
| 2013/0242612 A1 | 9/2013 | Lee et al. |
| 2013/0278544 A1 | 10/2013 | Cok |
| 2013/0293793 A1 | 11/2013 | Lu |
| 2013/0300985 A1 | 11/2013 | Bulda |
| 2013/0307831 A1 | 11/2013 | Robinson et al. |
| 2013/0308339 A1 | 11/2013 | Woodgate et al. |
| 2013/0321340 A1 | 12/2013 | Seo et al. |
| 2013/0328866 A1 | 12/2013 | Woodgate et al. |
| 2014/0009508 A1 | 1/2014 | Woodgate et al. |
| 2014/0022619 A1 | 1/2014 | Woodgate et al. |
| 2014/0071382 A1 | 3/2014 | Scardato |
| 2014/0098418 A1 | 4/2014 | Lin |
| 2014/0098558 A1 | 4/2014 | Vasylyev |
| 2014/0104147 A1 | 4/2014 | Nakahara et al. |
| 2014/0111760 A1 | 4/2014 | Guo et al. |
| 2014/0132887 A1 | 5/2014 | Kurata |
| 2014/0133181 A1 | 5/2014 | Ishida et al. |
| 2014/0140091 A1 | 5/2014 | Vasylyev |
| 2014/0140095 A1 | 5/2014 | Yuki et al. |
| 2014/0176873 A1 | 6/2014 | Shinohara et al. |
| 2014/0185322 A1 | 7/2014 | Liao |
| 2014/0201844 A1 | 7/2014 | Buck |
| 2014/0211125 A1 | 7/2014 | Kurata |
| 2014/0232836 A1 | 8/2014 | Woodgate et al. |
| 2014/0232960 A1 | 8/2014 | Schwartz et al. |
| 2014/0240344 A1 | 8/2014 | Tomono et al. |
| 2014/0240828 A1 | 8/2014 | Robinson et al. |
| 2014/0240839 A1 | 8/2014 | Yang et al. |
| 2014/0268358 A1 | 9/2014 | Kusaka et al. |
| 2014/0286043 A1 | 9/2014 | Sykora et al. |
| 2014/0286044 A1 | 9/2014 | Johnson et al. |
| 2014/0289835 A1 | 9/2014 | Varshavsky et al. |
| 2014/0340728 A1 | 11/2014 | Taheri |
| 2014/0361990 A1 | 12/2014 | Leister |
| 2014/0367873 A1 | 12/2014 | Yang et al. |
| 2015/0035872 A1 | 2/2015 | Shima et al. |
| 2015/0055366 A1 | 2/2015 | Chang et al. |
| 2015/0116212 A1 | 4/2015 | Freed et al. |
| 2015/0177447 A1 | 6/2015 | Woodgate et al. |
| 2015/0177563 A1 | 6/2015 | Cho et al. |
| 2015/0185398 A1 | 7/2015 | Chang et al. |
| 2015/0205157 A1 | 7/2015 | Sakai et al. |
| 2015/0268479 A1 | 9/2015 | Woodgate et al. |
| 2015/0286061 A1 | 10/2015 | Seo et al. |
| 2015/0286817 A1 | 10/2015 | Haddad et al. |
| 2015/0293273 A1 | 10/2015 | Chen et al. |
| 2015/0293289 A1 | 10/2015 | Shinohara et al. |
| 2015/0301400 A1 | 10/2015 | Kimura et al. |
| 2015/0338564 A1 | 11/2015 | Zhang et al. |
| 2015/0346417 A1 | 12/2015 | Powell |
| 2015/0346532 A1 | 12/2015 | Do et al. |
| 2015/0355490 A1 | 12/2015 | Kao et al. |
| 2015/0378085 A1 | 12/2015 | Robinson et al. |
| 2016/0054508 A1 | 2/2016 | Hirayama et al. |
| 2016/0103264 A1 | 4/2016 | Lee et al. |
| 2016/0132721 A1 | 5/2016 | Bostick et al. |
| 2016/0147074 A1 | 5/2016 | Kobayashi et al. |
| 2016/0154259 A1 | 6/2016 | Kim et al. |
| 2016/0216420 A1 | 7/2016 | Gaides et al. |
| 2016/0216540 A1 | 7/2016 | Cho et al. |
| 2016/0224106 A1 | 8/2016 | Liu |
| 2016/0238869 A1 | 8/2016 | Osterman et al. |
| 2016/0259115 A1 | 9/2016 | Kitano et al. |
| 2016/0291358 A1 | 10/2016 | Kikuchi et al. |
| 2016/0334898 A1 | 11/2016 | Kwak et al. |
| 2016/0349444 A1 | 12/2016 | Robinson et al. |
| 2016/0356943 A1 | 12/2016 | Choi et al. |
| 2016/0357046 A1 | 12/2016 | Choi et al. |
| 2017/0003436 A1 | 1/2017 | Inoue et al. |
| 2017/0031206 A1 | 2/2017 | Smith et al. |
| 2017/0085869 A1 | 3/2017 | Choi et al. |
| 2017/0090103 A1 | 3/2017 | Holman |
| 2017/0090237 A1 | 3/2017 | Kim et al. |
| 2017/0092187 A1 | 3/2017 | Bergquist |
| 2017/0092229 A1 | 3/2017 | Greenebaum et al. |
| 2017/0115485 A1 | 4/2017 | Saito et al. |
| 2017/0123241 A1 | 5/2017 | Su et al. |
| 2017/0139110 A1 | 5/2017 | Woodgate et al. |
| 2017/0168633 A1 | 6/2017 | Kwak et al. |
| 2017/0205558 A1 | 7/2017 | Hirayama et al. |
| 2017/0236494 A1 | 8/2017 | Sommerlade et al. |
| 2017/0269283 A1 | 9/2017 | Wang et al. |
| 2017/0269285 A1 | 9/2017 | Hirayama et al. |
| 2017/0276960 A1 | 9/2017 | Osterman et al. |
| 2017/0315423 A1 | 11/2017 | Serati et al. |
| 2017/0329399 A1 | 11/2017 | Azam et al. |
| 2017/0336661 A1 | 11/2017 | Harrold et al. |
| 2017/0339398 A1 | 11/2017 | Woodgate et al. |
| 2017/0343715 A1 | 11/2017 | Fang et al. |
| 2017/0363798 A1 | 12/2017 | Hirayama et al. |

(56) References Cited

U.S. PATENT DOCUMENTS

| | | | |
|---|---|---|---|
| 2017/0363913 | A1 | 12/2017 | Yi |
| 2018/0011173 | A1 | 1/2018 | Newman |
| 2018/0014007 | A1 | 1/2018 | Brown |
| 2018/0052346 | A1 | 2/2018 | Sakai et al. |
| 2018/0082068 | A1 | 3/2018 | Lancioni et al. |
| 2018/0095581 | A1 | 4/2018 | Hwang et al. |
| 2018/0113334 | A1 | 4/2018 | Fang et al. |
| 2018/0188576 | A1 | 7/2018 | Xu et al. |
| 2018/0188603 | A1 | 7/2018 | Fang et al. |
| 2018/0196275 | A1 | 7/2018 | Robinson et al. |
| 2018/0210243 | A1 | 7/2018 | Fang et al. |
| 2018/0210253 | A1 | 7/2018 | Kashima |
| 2018/0231811 | A1 | 8/2018 | Wu |
| 2018/0252949 | A1 | 9/2018 | Klippstein et al. |
| 2018/0259799 | A1 | 9/2018 | Kroon |
| 2018/0259812 | A1 | 9/2018 | Goda et al. |
| 2018/0284341 | A1 | 10/2018 | Woodgate et al. |
| 2018/0321523 | A1 | 11/2018 | Robinson et al. |
| 2018/0321553 | A1 | 11/2018 | Robinson et al. |
| 2018/0329245 | A1 | 11/2018 | Robinson et al. |
| 2018/0364526 | A1 | 12/2018 | Finnemeyer et al. |
| 2019/0086706 | A1 | 3/2019 | Robinson et al. |
| 2019/0121173 | A1 | 4/2019 | Robinson et al. |
| 2019/0154896 | A1 | 5/2019 | Yanai |
| 2019/0196235 | A1 | 6/2019 | Robinson et al. |
| 2019/0196236 | A1 | 6/2019 | Chen et al. |
| 2019/0197928 | A1 | 6/2019 | Schubert et al. |
| 2019/0215509 | A1 | 7/2019 | Woodgate et al. |
| 2019/0227366 | A1 | 7/2019 | Harrold et al. |
| 2019/0235304 | A1 | 8/2019 | Tamada et al. |
| 2019/0250458 | A1 | 8/2019 | Robinson et al. |
| 2019/0278010 | A1 | 9/2019 | Sakai et al. |
| 2019/0293858 | A1 | 9/2019 | Woodgate et al. |
| 2019/0293983 | A1 | 9/2019 | Robinson et al. |
| 2019/0353944 | A1 | 11/2019 | Acreman et al. |
| 2019/0361165 | A1 | 11/2019 | Chang et al. |
| 2020/0026125 | A1 | 1/2020 | Robinson et al. |
| 2020/0041839 | A1 | 2/2020 | Robinson et al. |
| 2020/0110301 | A1 | 4/2020 | Harrold et al. |
| 2020/0159055 | A1 | 5/2020 | Robinson et al. |
| 2020/0185590 | A1 | 6/2020 | Malhotra et al. |
| 2020/0218101 | A1 | 7/2020 | Ihas et al. |
| 2020/0225402 | A1 | 7/2020 | Ihas et al. |
| 2020/0233142 | A1 | 7/2020 | Liao et al. |
| 2021/0033898 | A1 | 2/2021 | Woodgate et al. |
| 2021/0116627 | A1 | 4/2021 | Tsuji |
| 2021/0149233 | A1 | 5/2021 | Robinson et al. |
| 2021/0373382 | A1 | 12/2021 | Sakai et al. |

FOREIGN PATENT DOCUMENTS

| | | | |
|---|---|---|---|
| CN | 1776484 | A | 5/2006 |
| CN | 101042449 | A | 9/2007 |
| CN | 101256251 | A | 9/2008 |
| CN | 101454712 | A | 6/2009 |
| CN | 101518095 | A | 8/2009 |
| CN | 101681061 | A | 3/2010 |
| CN | 103473494 | A | 12/2013 |
| CN | 103688211 | A | 3/2014 |
| CN | 104133292 | A | 11/2014 |
| CN | 104303085 | A | 1/2015 |
| CN | 104321686 | A | 1/2015 |
| CN | 104380177 | A | 2/2015 |
| CN | 204740413 | U | 11/2015 |
| CN | 105842909 | A | 8/2016 |
| CN | 106104372 | A | 11/2016 |
| CN | 106415342 | A | 2/2017 |
| CN | 209171779 | U | 7/2019 |
| EP | 1956423 | A1 | 8/2008 |
| EP | 2037318 | A1 | 3/2009 |
| GB | 2405542 | A | 3/2005 |
| GB | 2418518 | A | 3/2006 |
| GB | 2428100 | A | 1/2007 |
| GB | 2428345 | A | 1/2007 |
| GB | 2482065 | A | 1/2012 |
| GB | 2486935 | B | 9/2013 |
| JP | S58143305 | A | 8/1983 |
| JP | H01130783 | U | 9/1989 |
| JP | H11174489 | A | 7/1999 |
| JP | 2005316470 | A | 11/2005 |
| JP | 2005345799 | A | 12/2005 |
| JP | 2006139160 | A | 6/2006 |
| JP | 2007501966 | A | 2/2007 |
| JP | 2007148279 | A | 6/2007 |
| JP | 2007273288 | A | 10/2007 |
| JP | 2009020293 | A | 1/2009 |
| JP | 2011103241 | A | 5/2011 |
| JP | 2014032953 | A | 2/2014 |
| JP | 2014099363 | A | 5/2014 |
| KR | 20120011228 | A | 2/2012 |
| KR | 20130046116 | A | 5/2013 |
| KR | 1020150021937 | A | 3/2015 |
| KR | 1020170013915 | A | 2/2017 |
| KR | 1020170040565 | A | 4/2017 |
| KR | 101990286 | B1 | 6/2019 |
| TW | M537663 | U | 3/2017 |
| TW | I612360 | B | 1/2018 |
| WO | 2005071449 | A2 | 8/2005 |
| WO | 2006030702 | A1 | 3/2006 |
| WO | 2008001896 | A1 | 1/2008 |
| WO | 2008078764 | A1 | 7/2008 |
| WO | 2008093445 | A1 | 8/2008 |
| WO | 2009008406 | A1 | 1/2009 |
| WO | 2009011199 | A1 | 1/2009 |
| WO | 2010021926 | A2 | 2/2010 |
| WO | 2010143705 | A1 | 12/2010 |
| WO | 2014011328 | A1 | 1/2014 |
| WO | 2014130860 | A1 | 8/2014 |
| WO | 2015040776 | A1 | 3/2015 |
| WO | 2015057625 | A1 | 4/2015 |
| WO | 2015143227 | A1 | 9/2015 |
| WO | 2015157184 | A1 | 10/2015 |
| WO | 2015190311 | A1 | 12/2015 |
| WO | 2015200814 | A1 | 12/2015 |
| WO | 2016195786 | A1 | 12/2016 |
| WO | 2017050631 | A1 | 3/2017 |
| WO | 2017117570 | A1 | 7/2017 |
| WO | 2018035492 | A1 | 2/2018 |
| WO | 2018178790 | A1 | 10/2018 |
| WO | 2018208618 | A1 | 11/2018 |
| WO | 2019055755 | A1 | 3/2019 |
| WO | 2019067846 | A1 | 4/2019 |
| WO | 2019147762 | A1 | 8/2019 |
| WO | 2021003383 | A1 | 1/2021 |

OTHER PUBLICATIONS

EP-18855604.7 Extended European Search Report of European Patent Office dated Jun. 1, 2021.
EP-18857077.4 Extended European Search Report of European Patent Office dated Jun. 16, 2021.
CN-201980020303.0—Notification of the First Office Action dated Dec. 16, 2021.
CN201980030279.9 Notification of the First Office Action dated Mar. 29, 2022.
EP-19825448.4 Extended European Search Report of European Patent Office dated Mar. 10, 2022.
JP2019-561773 Non-Final Notice of Reasons for Rejection dated Mar. 22, 2022.
Cheng, et al., "Fast-Response Liquid Crystal Variable Optical Retarder and Multilevel Attenuator," Optical Engineering 52 (10), 107105 (Oct. 16, 2013). (Year: 2013).
PCT/US2021/029937 International search report and written opinion of the international searching authority dated Aug. 6, 2021.
PCT/US2021/029944 International search report and written opinion of the international searching authority dated Aug. 3, 2021.
PCT/US2021/029947 International search report and written opinion of the international searching authority dated Aug. 10, 2021.
PCT/US2021/029954 International search report and written opinion of the international searching authority dated Aug. 10, 2021.
PCT/US2021/029958 International search report and written opinion of the international searching authority dated Aug. 10, 2021.

(56) References Cited

OTHER PUBLICATIONS

EP-20754927.0 Extended European Search Report of European Patent Office dated Sep. 19, 2022.
EP-19881483.2 Extended European Search Report of European Patent Office dated Aug. 5, 2022.
JP2020-509511 Non-Final Notice of Reasons for Rejection dated Jul. 19, 2022.
Nelkon et al., "Advanced Level Physics", Third edition with SI units, Heinemann Educational Books LTD, London, 1970.
TW107132221 First Office Action dated Apr. 28, 2022.
CN201680061632.6 Notification of the First Office Action dated Sep. 14, 2021.
CN201880073578.6 Notification of the First Office Action dated Aug. 27, 2021.
EP-19743619.9 Extended European Search of European Patent Office dated Nov. 23, 2021.
EP-19743701.5 Extended European Search Report of European Patent Office dated Nov. 24, 2021.
EP19771688.9 Extended European Search Report of European Patent Office dated Dec. 2, 2021.
PCT/US2021/043435 International search report and written opinion of the international searching authority dated Nov. 1, 2021.
PCT/US2021/043444 International search report and written opinion of the international searching authority dated Nov. 1, 2021.
Adachi, et al. "P-228L: Late-News Poster: Controllable Viewing-Angle Displays using a Hybrid Aligned Nematic Liquid Crystal Cell", ISSN, SID 2006 Digest, pp. 705-708.
Brudy et al., "Is Anyone Looking? Mitigating Shoulder Surfing on Public Displays through Awareness and Protection", Proceedings of The International Symposium on Persuasive Displays (Jun. 3, 2014), pp. 1-6.
CN201780030715.3 Notification of the First Office Action dated Jan. 21, 2020.
EP-16860628.3 Extended European Search Report of European Patent Office dated Apr. 26, 2019.
EP-17799963.8 Extended European Search Report of European Patent Office dated Oct. 9, 2019.
Gass, et al. "Privacy LCD Technology for Cellular Phones", Sharp Laboratories of Europe Ltd, Mobile LCD Group, Feb. 2007, pp. 45-49.
Ishikawa, T., "New Design for a Highly Collimating Turning Film", SID 06 Digest, pp. 514-517.
Kalantar, et al. "Backlight Unit With Double Surface Light Emission," J. Soc. Inf. Display, vol. 12, Issue 4, pp. 379-387 (Dec. 2004).
CN-201880042320.X Notification of the Third Office Action from the Chinese Patent Office dated Dec. 30, 2022.
CN-201980082757.0 Notification of the 1st Office Action of the Chinese Patent Office dated Dec. 5, 2022.
JP2020-540724 Non-Final Notice of Reasons for Rejection dated Jan. 4, 2023.
JP-2020-540797 Non-Final Notice of Reasons for Rejection from the Japan Patent Office dated Dec. 6, 2022.
PCT/US2022/045030 International search report and written opinion of the international searching authority dated Jan. 3, 2023.
EP-20835231.0 Extended European Search Report of European Patent Office dated May 15, 2023.
PCT/US2023/012240 International search report and written opinion of the international searching authority dated Apr. 27, 2023.
PCT/US2023/012243 International search report and written opinion of the international searching authority dated May 10, 2023.
EP19771688.9 Notification of the First Office Action dated Mar. 6, 2023.
JP2020-550747 Non-Final Notice of Reasons for Rejection dated Mar. 29, 2023.
KR10-2020-7010753 Notice of Preliminary Rejection dated Feb. 17, 2023.
PCT/US2016/058695 International search report and written opinion of the international searching authority dated Feb. 28, 2017.
PCT/US2017/032734 International search report and written opinion of the international searching authority dated Jul. 27, 2017.
PCT/US2018/031206 International search report and written opinion of the international searching authority dated Jul. 20, 2018.
PCT/US2018/031218 International search report and written opinion of the international searching authority dated Jul. 19, 2018.
PCT/US2018/051021 International search report and written opinion of the international searching authority dated Nov. 21, 2018.
PCT/US2018/051027 International search report and written opinion of the international searching authority dated Nov. 30, 2018.
PCT/US2018/053328 International search report and written opinion of the international searching authority dated Nov. 30, 2018.
PCT/US2018/059249 International search report and written opinion of the international searching authority dated Jan. 3, 2019.
PCT/US2018/059256 International search report and written opinion of the international searching authority dated Jan. 3, 2019.
PCT/US2019/014889 International search report and written opinion of the international searching authority dated May 24, 2019.
PCT/US2019/014902 International search report and written opinion of the international searching authority dated Jun. 25, 2019.
PCT/US2019/023659 International search report and written opinion of the international searching authority dated Jun. 10, 2019.
PCT/US2019/038409 International search report and written opinion of the international searching authority dated Sep. 19, 2019.
PCT/US2019/038466 International search report and written opinion of the international searching authority dated Nov. 5, 2019.
PCT/US2019/042027 International search report and written opinion of the international searching authority dated Oct. 15, 2019.
PCT/US2019/054291 International search report and written opinion of the international searching authority dated Jan. 6, 2020.
PCT/US2019/059990 International search report and written opinion of the international searching authority dated Feb. 28, 2020.
PCT/US2019/066208 International search report and written opinion of the international searching authority dated Feb. 27, 2020.
PCT/US2020/017537 International search report and written opinion of the international searching authority dated Apr. 29, 2020.
PCT/US2020/040686 International search report and written opinion of the international searching authority dated Nov. 20, 2020.
PCT/US2020/044574 International search report and written opinion of the international searching authority dated Oct. 21, 2020.
PCT/US2020/053863 International search report and written opinion of the international searching authority dated Mar. 12, 2021.
PCT/US2020/060155 International search report and written opinion of the international searching authority dated Feb. 5, 2021.
PCT/US2020/060191 International search report and written opinion of the international searching authority dated Feb. 8, 2021.
PCT/US2020/063638 International search report and written opinion of the international searching authority dated Mar. 2, 2021.
PCT/US2020/064633 International search report and written opinion of the international searching authority dated Mar. 15, 2021.
Robson, et al. "Spatial and temporal contrast-sensitivity functions of the visual system", J. Opt. Soc. Amer., vol. 56, pp. 1141-1142 (1966).
Simonyan et al., "Very Deep Convolutional Networks for Large-Scale Image Recognition", ICLR 2015.
Weindorf et al., "Active Circular Polarizer OLED E-Mirror", Proceedings of the Society for Information Display 25th Annual Symposium of Vehicle Displays, Livonia, MI, pp. 225-237, Sep. 25-26, 2018.
Chiu, et al, "Advanced Hyoer-Viewing Angle Controllable LCD", 39-1 / M.-H. Chiu Invited Paper; AUO Technology Center, AU Optronics Corp., Hsinchu, Taiwan, SID 2021 Digest, ISSN 0097-996X/21/5202-0543, pp. 543-545.
EP-20851155.0 Extended European Search Report of European Patent Office dated Aug. 2, 2023.
PCT/US2023/017639 International search report and written opinion of the international searching authority dated Jul. 6, 2023.

CONTROL OF REFLECTIONS OF A DISPLAY DEVICE

TECHNICAL FIELD

This disclosure generally relates to control of reflections of light output from a display device comprising a display panel.

BACKGROUND

In many optical arrangements, reflections from surfaces of optically transmissive material, such as bare transparent windows, are a problem, particularly when viewed at night from an illuminated interior when significant reflections occur, giving a mirror appearance. While such reflections in houses are typically avoided by shades, such an option is not available in many optical arrangements, such as vehicles where reflections of bright internal displays can cause significant distraction.

One method to alleviate this issue is to introduce display devices with highly directional output. Such display devices would allow viewers, for example the driver and/or passengers in the case of a vehicle, to see an image displayed on the display device, while minimizing the light directed towards surfaces of optically transmissive material. However, such display devices typically require additional components and so are relatively expensive to manufacture.

The present disclosure is concerned with controlling such reflections from surfaces of optically transmissive material.

BRIEF SUMMARY

According to a first aspect of the present disclosure, there is provided a method of controlling reflections of light output from a display device comprising a display panel arranged to output light that has a predetermined polarization state, the method using at least one optical retarder arranged on the output side of the display panel, the method comprising: defining a first plane of incidence in respect of a first ray of light output from the display device and a first normal to a first surface of optically transmissive material at a first point at which the first ray of light is reflected and a second plane of incidence in respect of a second ray of light output from the display device and a second normal to a second surface of optically transmissive material at a second point at which the second ray of light is reflected; and selecting the at least one optical retarder, in at least one mode of the at least one optical retarder, to cause the polarization state of the first ray of light to be linearly polarized in a direction that is in the first plane of incidence, and to cause the polarization state of the second ray of light to be linearly polarized in a direction that is in the second plane of incidence.

This method makes use of the reflection sensitivity of linearly polarized light resulting from Fresnel reflection at the surface. In particular, the reflectivity of a surface of optically transmissive material is lower for light that is linearly polarised in a direction in the plane of incidence (p-polarised light) than for light that is linearly polarised in a direction perpendicular to the plane of incidence (s-polarised light). The reflectivity of p-polarised light dips by a significant amount below the reflectivity of s-polarised light across most angles of incidence at the surface, reaching zero at some angles.

Most display panels output light that has a predetermined polarization state. For example, LCD (liquid crystal display) display devices are ubiquitous in vehicles as they deliver the high brightness levels required during daytime driving. Such LCD display devices function by modulating polarized light and provide linearly polarized output.

Also, this method uses the observation that a desired polarization state for a particular ray of a particular wavelength can always be transformed from any input polarization state with an arbitrary retarder whose optical axis and retardance are freely selected, and so it is possible to select optical retarders to independently control the polarisation state of two different rays of light output from a display device. This is undesirable in many optical arrangements where polarisation is used to provide a desired optical effect, but is an effect of the optical axis of the material of an optical retarder being aligned in a different direction with respect to each of the rays that is utilised to positive effect in this method.

Reflections of light from first and second surfaces of optically transmissive material are considered. Rays of light output from the display device and reflected from the first and second surfaces to a common viewing position are then defined. This permits definition of first and second planes of incidence in respect of the first and second rays of light and first and second normals to the first and second surfaces at first and second points at which the first and second rays of light are reflected. Thereafter, the at least one optical retarder is selected so that, in at least one mode of the at least one optical retarder, the polarization state of the first ray of light is caused to be linearly polarized in a direction that is in the first plane of incidence (i.e. p-polarised), and the polarization state of the second ray of light is also caused to be linearly polarized in a direction that is in the second plane of incidence (p-polarised). As a result, each ray of light is p-polarised with respect to reflection from its respective surface. This simultaneously minimises the amount of reflection from each surface compared to a situation in which the polarisation state is not so controlled and so some of the first and/or second rays of light may in general be, or at least include a component of, s-polarised light.

The selection of the at least one optical retarder may involve selection of the direction of the optical axis of the at least one optical retarder and the retardance of the at least one optical retarder to control the polarisation state of the two rays of light in the desired manner.

By way of example, one may consider the case of the optical arrangement being a vehicle containing an LCD display device mounted on the dashboard. The light output by the display device might advantageously be linearly polarized in a vertical direction to match the transmission of anti-glare polarized glasses when worn by a driver. In that case, the plane of incidence of a first ray of light reflected from the windshield is predominantly p-polarized with respect to the reflection geometry and so minimally reflected. This however is not the case for a second ray of light reflected from side windows, absent this method. That is, the second ray of light reflected from the side window is predominantly s-polarized and so the reflectivity is relatively high. However, with this method, the at least one optical retarder may causes the polarization state of the second ray of light to be transformed to be p-polarised, while maintain the p-polarisation of the first ray of light incident on the windshield, providing an elegant solution to the problem of reflection from the side windows.

According to a further aspect of the present disclosure, there is provided a display device comprising: a display panel arranged to output light that has a predetermined polarization state; and at least one optical retarder arranged on the output side of the display panel, wherein, defining a first plane of incidence in respect of a first ray of light output from the display device and a first normal to a first surface of optically transmissive material at a first point at which the first ray of light is reflected and a second plane of incidence in respect of a second ray of light output from the display device and a second normal to a second surface of optically transmissive material at a second point at which the second ray of light is reflected, the at least one optical retarder is selected, in at least one mode of the at least one optical retarder, to cause the polarization state of the first ray of light to be linearly polarized in a direction that is in the first plane of incidence, and to cause the polarization state of the second ray of light to be linearly polarized in a direction that is in the second plane of incidence.

Such a display device controls reflections in a similar manner to the first aspect of the present disclosure, as discussed above.

The display device may be incorporated in an optical arrangement that also comprises the first and second surfaces. Such an optical arrangement may be, for example, a vehicle, in which case the first and second surfaces may be surfaces of windows of the vehicle.

Embodiments of the present disclosure may be used in a variety of optical arrangements. The embodiments may include or work with a variety of projectors, projection systems, optical components, displays, microdisplays, computer systems, processors, self-contained projector systems, visual and/or audio-visual systems and electrical and/or optical devices. Aspects of the present disclosure may be used with practically any apparatus related to optical and electrical devices, optical systems, presentation systems or any apparatus that may contain any type of optical system. Accordingly, embodiments of the present disclosure may be employed in devices used in visual and/or optical presentations, visual peripherals and so on and in a number of computing environments.

Before proceeding to the disclosed embodiments in detail, it should be understood that the disclosure is not limited in its application or creation to the details of the particular arrangements shown, because the disclosure is capable of other embodiments. Moreover, aspects of the disclosure may be set forth in different combinations and arrangements to define embodiments unique in their own right. Also, the terminology used herein is for the purpose of description and not of limitation.

These and other advantages and features of the present disclosure will become apparent to those of ordinary skill in the art upon reading this disclosure in its entirety.

BRIEF DESCRIPTION OF THE DRAWINGS

Embodiments are illustrated by way of example in the accompanying FIGURES, in which like reference numbers indicate similar parts, and in which.

DETAILED DESCRIPTION

Figure 1:
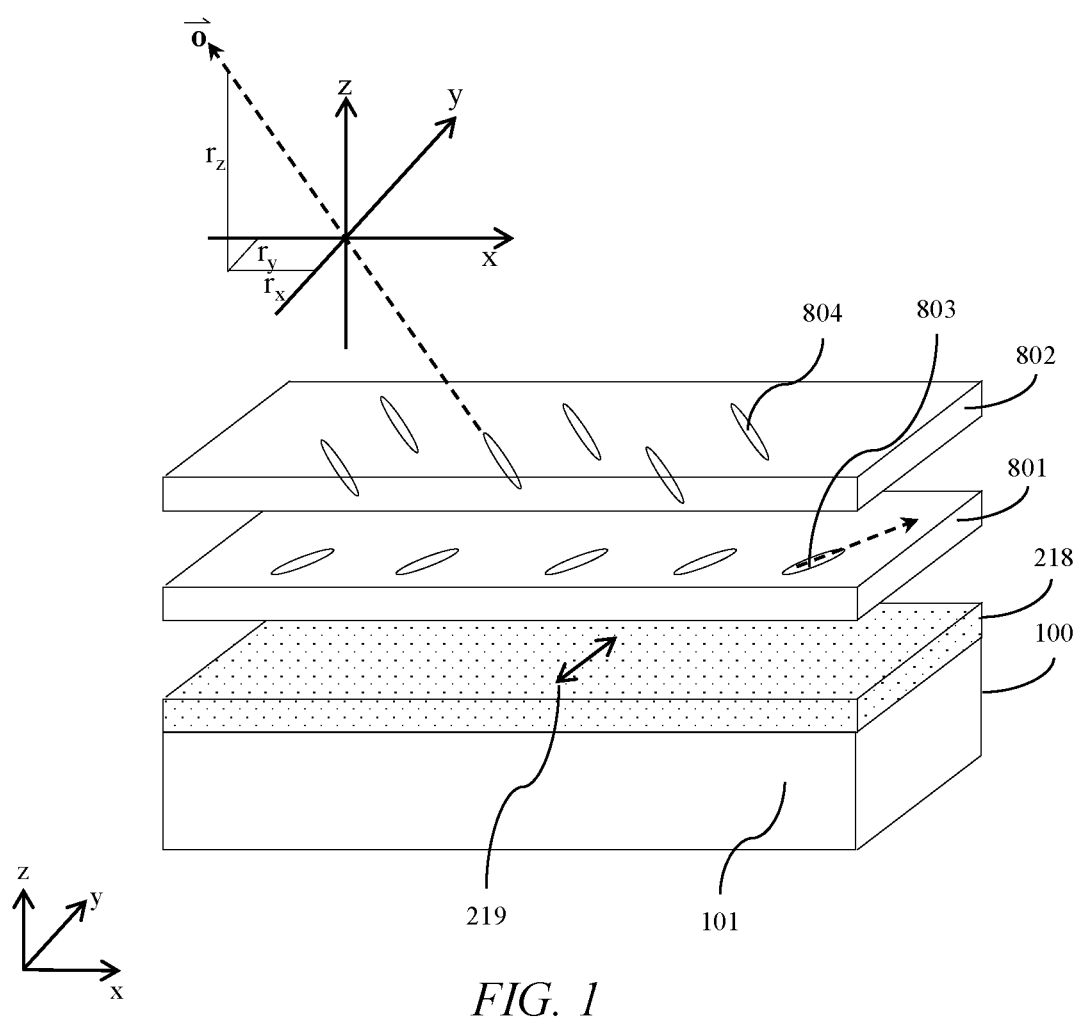
FIG. 1, FIG. 2, and FIG. 3 are side perspective views of alternative constructions for a transmissive display device which controls reflections within an optical arrangement.

Terms related to optical retarders for the purposes of the present disclosure will now be described.

In a layer comprising a uniaxial birefringent material there is a direction governing the optical anisotropy whereas all directions perpendicular to it (or at a given angle to it) are optically equivalent.

Optical axis refers to the direction of propagation of an unpolarised light ray in the uniaxial birefringent material in which no birefringence is experienced by the ray. For light propagating in a direction orthogonal to the optical axis, the optical axis is the slow axis when linearly polarized light with an electric vector direction parallel to the optical axis travels at the slowest speed. The slow axis direction is the direction with the highest refractive index at the design wavelength. Similarly the fast axis direction is the direction with the lowest refractive index at the design wavelength.

For positive dielectric anisotropy uniaxial birefringent materials the slow axis direction is the extraordinary axis of the birefringent material. For negative dielectric anisotropy uniaxial birefringent materials the fast axis direction is the extraordinary axis of the birefringent material.

The terms half a wavelength and quarter a wavelength refer to the operation of a retarder for a design wavelength $\lambda_0$ that may typically be between 450 nm and 570 nm. In the present illustrative embodiments exemplary retardance values are provided for a wavelength of 550 nm unless otherwise specified.

The retarder provides a phase shift between two perpendicular polarization components of the light wave incident thereon and is characterized by the amount of relative phase, $\Gamma$, that it imparts on the two polarization components; which is related to the birefringence $\Delta n$ and the thickness d of the retarder by:

$$\Gamma = 2 \cdot \pi \Delta n \cdot d / \lambda_0 \qquad \text{eqn. 1}$$

where $\Delta n$ is defined as the difference between the extraordinary and the ordinary index of refraction, i.e.

$$\Delta n = n_e - n_o \qquad \text{eqn. 2}$$

Herein, a "half-wave retardance" of an optical retarder refers to the relationship between d, $\Delta n$, and $\lambda_0$ being chosen so that the phase shift between polarization components $\Gamma$ is an odd multiple of $\pi$, that is $\pi$, $3\pi$, $5\pi$, etc. These values result in the optical retarder providing a transformation of light having a linearly polarised polarisation state into another linearly polarised polarisation state, rather than an elliptical polarisation state. To achieve this effect, then in general the relative phase shift $\Gamma$ may be any odd multiple of $\pi$, although in practice it is often desirable to select the relative phase shift $\Gamma$ to be $\pi$, as this reduces chromatic effects.

Such a half-wave retardance in general has a different value for light propagating along different rays of light which may be normal to the spatial light modulator or at an angle to the normal. Although it is common to define a retarder with respect to its retardance along the normal to the retarder, herein the methods are concerned with effects along different rays and so a half-wave retardance will be defined with respect to a given ray.

In the present disclosure an 'A-plate' refers to an optical retarder utilizing a layer of birefringent material with its optical axis parallel to the plane of the layer. The plane of the retarders refers to the slow axis of the retarders extend in a plane, that is the x-y plane.

A 'positive A-plate' refers to positively birefringent A-plates, i.e. A-plates with a positive $\Delta n$.

In the present disclosure a 'C-plate' refers to an optical retarder utilizing a layer of birefringent material with its optical axis perpendicular to the plane of the layer. A 'positive C-plate' refers to a positively birefringent C-plate, i.e. a C-plate with a positive $\Delta n$. A 'negative C-plate' refers to a negatively birefringent C-plate, i.e. a C-plate with a negative $\Delta n$.

In the present disclosure an 'O-plate' refers to an optical retarder utilizing a layer of birefringent material with its optical axis having a component parallel to the plane of the layer and a component perpendicular to the plane of the layer. A 'positive O-plate' refers to positively birefringent O-plates, i.e. O-plates with a positive $\Delta n$.

Achromatic retarders may be provided wherein the material of the retarder is provided with a retardance $\Delta n \cdot d$ that varies with wavelength $\lambda$ as:

$$\Delta n \cdot d / \lambda = \kappa \qquad \text{eqn. 3}$$

where $\kappa$ is substantially a constant.

Examples of suitable materials include modified polycarbonates from Teijin Films. Achromatic retarders may be provided in the present embodiments to advantageously minimise colour changes between polar angular viewing directions which have low luminance reduction and polar angular viewing directions which have increased luminance reductions as will be described below.

Various other terms used in the present disclosure related to retarders and to liquid crystals will now be described.

A liquid crystal cell has a retardance given by $\Delta n \cdot d$ where $\Delta n$ is the birefringence of the liquid crystal material in the liquid crystal cell and d is the thickness of the liquid crystal cell, independent of the alignment of the liquid crystal material in the liquid crystal cell.

Homogeneous alignment refers to the alignment of liquid crystals in switchable liquid crystal displays where molecules align substantially parallel to a substrate. Homogeneous alignment is sometimes referred to as planar alignment. Homogeneous alignment may typically be provided with a small pre-tilt such as 2 degrees, so that the molecules at the surfaces of the alignment layers of the liquid crystal cell are slightly inclined as will be described below. Pretilt is arranged to minimise degeneracies in switching of cells.

In the present disclosure, homeotropic alignment is the state in which rod-like liquid crystalline molecules align substantially perpendicularly to the substrate. In discotic liquid crystals homeotropic alignment is defined as the state in which an axis of the column structure, which is formed by disc-like liquid crystalline molecules, aligns perpendicularly to a surface. In homeotropic alignment, pretilt is the tilt angle of the molecules that are close to the alignment layer and is typically close to 90 degrees and for example may be 88 degrees, such that there is an in-plane component that is small in magnitude relative to the component normal to the alignment layer.

Liquid crystal molecules with positive dielectric anisotropy are switched from a homogeneous alignment (such as an A-plate retarder orientation) to a homeotropic alignment (such as a C-plate or O-plate retarder orientation) by means of an applied electric field.

Liquid crystal molecules with negative dielectric anisotropy are switched from a homeotropic alignment (such as a C-plate or O-plate retarder orientation) to a homogeneous alignment (such as an A-plate retarder orientation) by means of an applied electric field.

Rod-like molecules have a positive birefringence so that $n_e > n_o$ as described in eqn. 2. Discotic molecules have negative birefringence so that $n_e < n_o$.

Positive retarders such as A-plates, positive O-plates and positive C-plates may typically be provided by stretched films or rod-like liquid crystal molecules. Negative retarders such as negative C-plates may be provided by stretched films or discotic-like liquid crystal molecules.

Parallel liquid crystal cell alignment refers to the alignment direction of homogeneous alignment layers being parallel or more typically antiparallel. In the case of pretilted homeotropic alignment, the alignment layers may have components that are substantially parallel or antiparallel. Hybrid aligned liquid crystal cells may have one homogeneous alignment layer and one homeotropic alignment layer. Twisted liquid crystal cells may be provided by alignment layers that do not have parallel alignment, for example oriented at 90 degrees to each other.

Transmissive spatial light modulators may further comprise retarders between the input display polariser and the output display polariser, for example as disclosed in U.S. Pat. No. 8,237,876, which is herein incorporated by reference in its entirety. Such retarders (not shown) are in a different place to the passive retarders of the present embodiments. Such retarders compensate for contrast degradations for off-axis viewing locations, which is a different effect to the luminance reduction for off-axis viewing positions of the present embodiments.

The structure and operation of various display devices will now be described. In this description, common elements have common reference numerals. It is noted that the disclosure relating to any element applies to each device in which the same or corresponding element is provided. Accordingly, for brevity such disclosure is not repeated.

Figure 2:
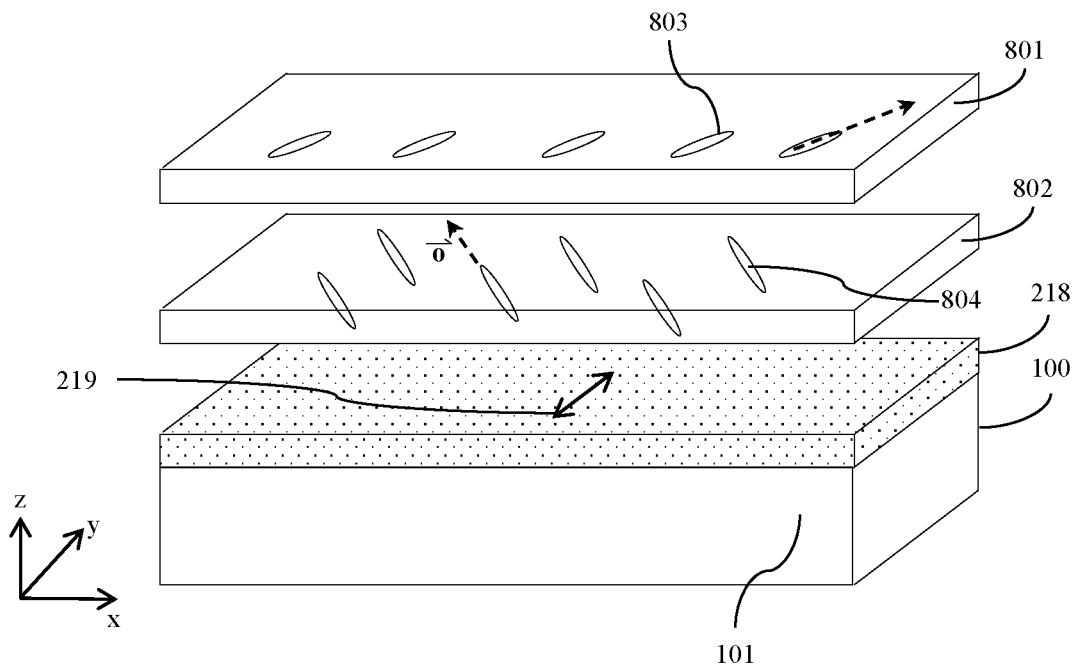
Figure 3:
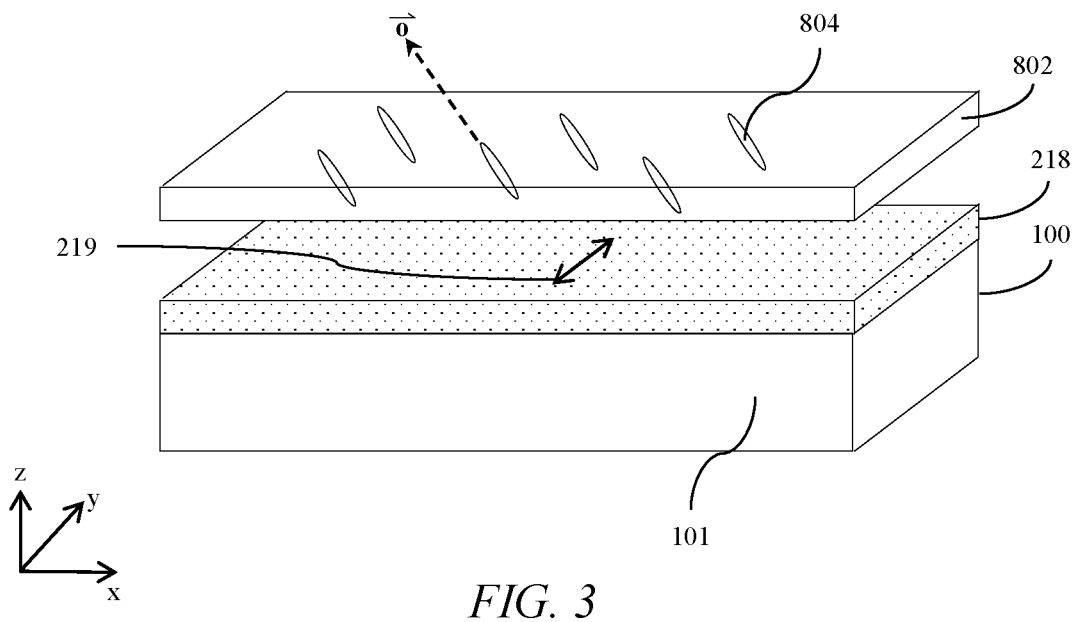

FIGS. 1-3 are side perspective views of alternative constructions of a display device 100 which controls reflections within an optical arrangement.

In each of FIGS. 1-3, the display device 100 includes a display panel 101. The display panel 101 includes output polariser 218 arranged on the output side of the display panel 101 so that the display panel 101 outputs light that has a predetermined polarization state of being linearly polarised. The direction of linear polarization corresponds to the electric vector transmission direction 219 of the output polariser 218. In the case of a ray of light along the normal to the plane of the output polariser 218, the direction of linear polarization is the same as the electric vector transmission direction 219. In the case of a ray of light at an acute angle to the normal to the plane of the output polariser 218, the direction of linear polarization is the projection of the electric vector transmission direction 219 onto a plane normal to the ray of light.

Provided that the output polariser 218 is present, the display panel 101 may be of a wide range of types, as discussed further below.

In each of FIGS. 1-3, reflections of light output from the display device 100 are controlled using at least one optical retarder arranged on the output side of the display panel 101, as follows.

In the examples of FIGS. 1 and 2, the at least one retarder comprises a first optical retarder 801 and a second optical retarder 802. The first optical retarder 801 comprises birefringent molecules 803, and has an optical axis parallel to the plane of the first optical retarder 801, so may be referred to as an A-plate. The second optical retarder 802 comprises birefringent molecules 804, and has an optical axis at an acute angle to the plane of the second optical retarder 802 in direction o, in at least a mode of operation of the second optical retarder 802, so may be referred to as an O-plate.

In general, the first optical retarder 801 and the second optical retarder 802 may be in either order with respect to the transmission of light from the display panel 101. Thus, in the example of FIG. 1 the first optical retarder 801 is arranged before the second optical retarder 802, whereas in the example of FIG. 2 the order is reversed so that the second optical retarder 802 is arranged before the first optical retarder 801.

Whereas the examples of examples of FIGS. 1 and 2 include two optical retarders, more generally any number of one or more optical retarders may be provided to provide the desired control of polarisation state of rays of light. In a simple example shown in FIG. 3 the first optical retarder 801 is omitted so that only the second optical retarder 802 is present. In other examples (not illustrated) more than two optical retarders may be provided.

Figure 4:
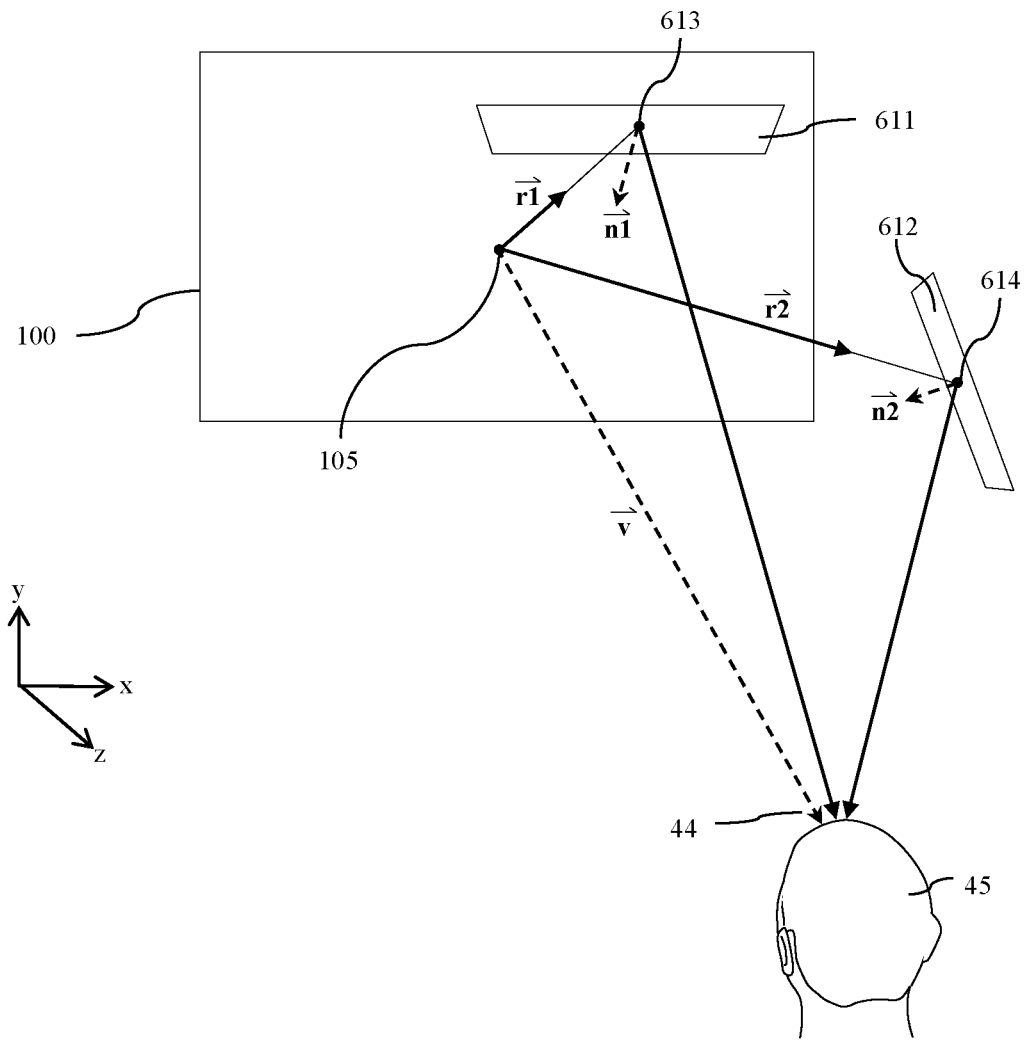
FIG. 4 is a front perspective view of the optical arrangement including the display device of FIGS. 1-3 and first and second surfaces.

FIG. 4 is a front perspective view of the optical arrangement including the display device 100 of FIGS. 1-3, as well as a first surface 611 of optically transmissive material and a second surface 612 of optically transmissive material.

The display device 100 controls reflections from the first and second surfaces 611 and 612. The optical arrangement may be any type of optical arrangement including first and second surfaces 610 and 612 from which it is desired to control reflections. In one example, the optical arrangement may be a vehicle. In the case of a vehicle, the display device 100 may be any type of display device located within the vehicle, for example being an LCD, OLED or micro-LED display device or a simple instrument display device such as provided for illuminated switches. In the case of a vehicle, the first and second surfaces 610 and 612 may be surfaces of windows of the vehicle, for example the windshield and side windows.

The optically transmissive material may be any optically transmissive material from which Fresnel reflection occurs, non-limitative examples including glass and plastic.

Figure 5:
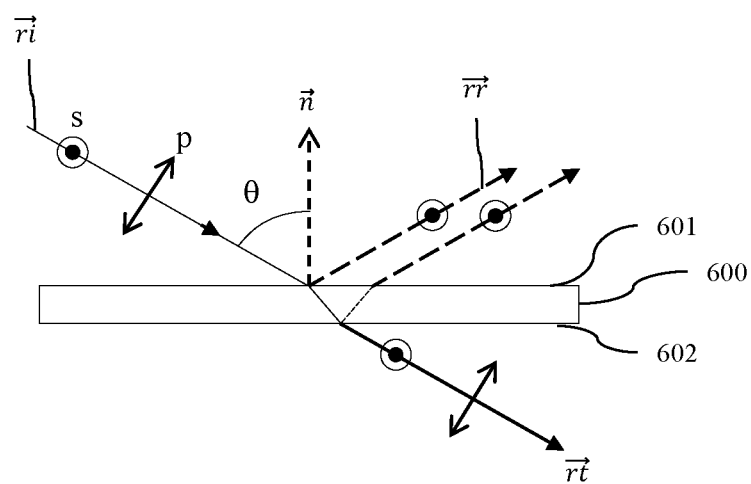
FIG. 5 is a side view of reflections of linearly polarised light from surfaces of a sheet of optically transmissive material.

FIG. 5 is a side view of reflections of linearly polarised light from surfaces 601 and 602 of a sheet of optically transmissive material 610.

The polarization of light relates to the time dependent direction of its oscillating electric field and can lie anywhere in the plane orthogonal to its propagation direction. If its direction remains constant while its amplitude oscillates sinusoidally it is said to have linear polarization which can be split into any two orthogonal components, each orthogonal to the propagation. For any given reflection surface there is a plane of incidence containing the surface normal vector n together with the incident ray ri and the reflected ray rr (in the plane of the drawing in FIG. 5). A polarization component of the incident ray ri that is perpendicular to the plane of incidence is called the s-polarization component s and polarization component of the incident ray ri that lies in the plane of incidence is called the p-polarization component p.

Figure 6:
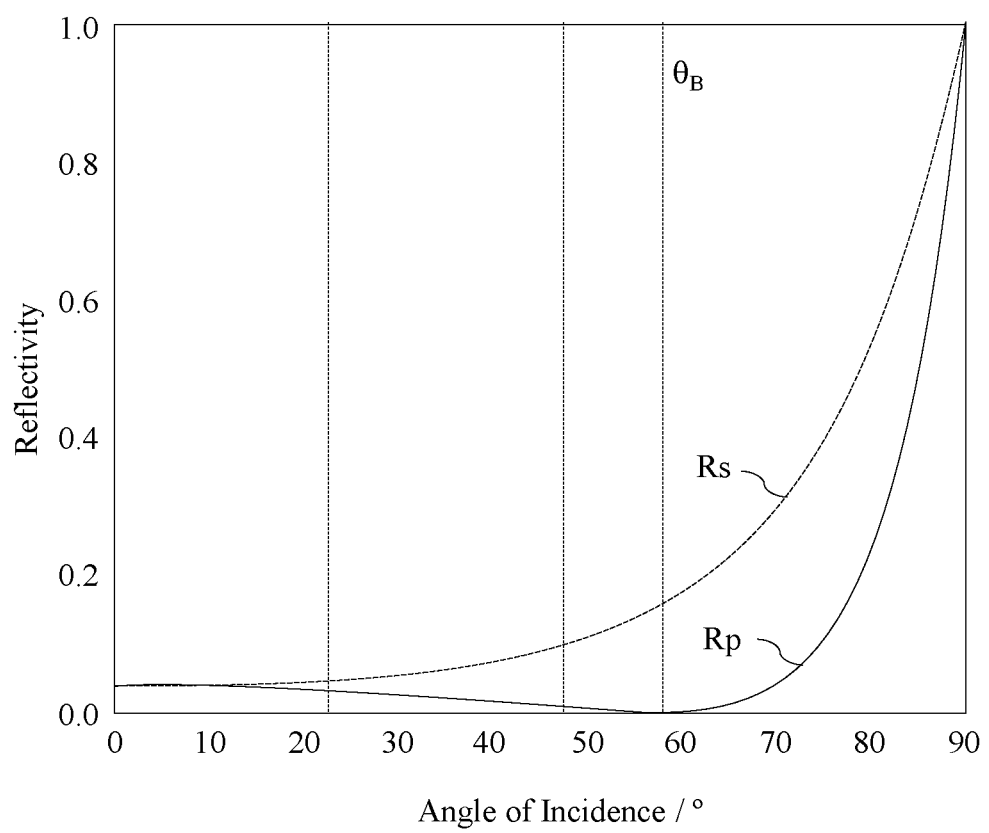
FIG. 6 is a graph of reflectivity of linearly polarised light from surfaces of a sheet of optically transmissive material.

FIG. 6 is a graph of reflectivity of linearly polarised light from surfaces of a sheet of optically transmissive material with a refractive index of 1.5. The interaction of light with the surfaces 601 and 602 of the sheet of optically transmissive material 600 is significantly differently for the s-polarization component s and the p-polarization component p, in accordance with the Fresnel equations. By way of example, FIG. 6 shows the variation with angle of incidence $\theta$ of reflectivities Rs and Rp of a sheet of material 600 for the s-polarization component s and the p-polarization component p, respectively. As can be seen, the reflectivities Rs and Rp vary significantly, the reflectivity Rp of the p-polarization component p dipping by a significant amount below the reflectivity Rs of the s-polarization component, and reaching zero when the angle of incidence $\theta$ is at the Brewster angle $\theta_B$.

The reflections are controlled by selecting the first and second optical retarders 801 and 802 in the display device 100 (or in the general case the or each optical retarder), using the following method. In this example, both reflections are reduced for the same viewer.

Returning to the description of FIG. 4, firstly a viewing position 44 is defined from where a viewer 45 is intended to view the display device 100. The viewing position 44 is a defined by a vector v relative to a predetermined point 105 on the display device 100, typically at the centre of the display device 100.

Next, there are identified first and second rays of light r1 and r2 output from the predetermined point 105 on the display device 100 and reflected from the first and second surfaces 610 and 612, respectively, to the common viewing position 44. For each of the first and second rays of light r1 and r2, there is identified the first and second points 613 and 614 at which the reflections on the first and second surfaces 611 and 612 occur. The first and second rays of light r1 and r2 are represented by the vectors from the predetermined point 105 on the display device 100 to the first and second points 613 and 614, respectively. The first and second normals n1 and n2 of the first and second surfaces 611 and 612 at the first and second points 613 and 614, respectively, are similarly identified.

Next, planes of incidence in respect of the first and second rays of light r1 and r2 are defined. Specifically, a first plane of incidence is defined in respect of the first ray of light r1 and the first normal n1 and a second plane of incidence in respect of a second ray of light r2 and the second normal n2.

For each of the first and second rays of light r1 and r2, a polarisation component in a direction perpendicular to the respective plane of incidence (s-polarisation component) and a polarisation component in a direction in the respective plane of incidence (p-polarisation component) may be defined.

In a vector representation, given reflection of a ray of light r from point on a surface at a point with a normal n, the s-polarisation component s is perpendicular to r and ns and so given by the equation:

$$s = \frac{(r \times ns)}{|(r \times ns)|} \quad \text{eqn. 4}$$

Similarly, the p-polarisation component p is perpendicular to r and s and so given by the equation:

$$p = \frac{r \times (r \times ns)}{|r \times (r \times ns)|} \quad \text{eqn. 5}$$

Next the first and second optical retarders 801 and 802 are selected, having regard to the predetermined polarization state of the light output from the display device 100 so that the polarization state of the first ray of light r1 is caused to be linearly polarized in a direction that is in the first plane of incidence (i.e. p-polarised), and the polarization state of the second ray of light is to caused to be to be linearly polarized in a direction that is in the second plane of incidence (i.e. p-polarised). In the general case that the predetermined polarization states of the first and second rays of light r1 and r2 output from the display panel 101 are not already p-polarised, this involves the first and second optical retarders 801 and 802 transforming the polarization states of the first and second rays of light r1 and r2. However, in some specific cases one of the first and second rays of light r1 and r2 output from the display device 100 may already be p-polarised, in which case the first and second optical retarders 801 and 802 may be selected to have no effect on that ray of light.

This has the effect of causing both the first and second rays of light r1 and r2 to be p-polarised, thereby simultaneously minimising the amount of reflection from both of the first and second surfaces 611 and 612.

Figure 7:
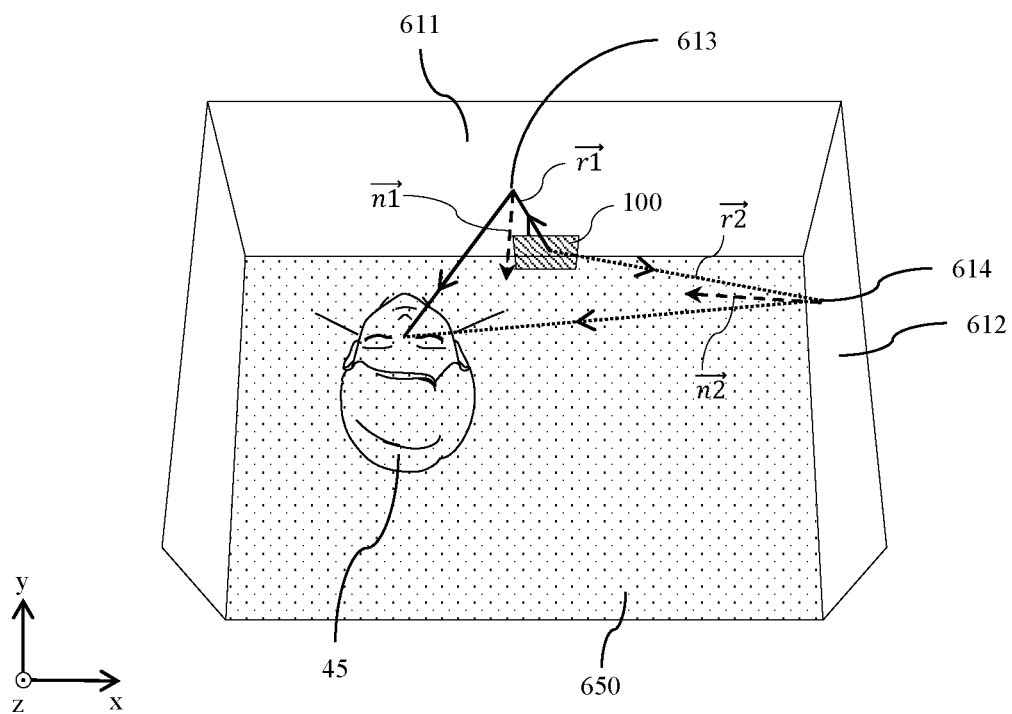
FIG. 7 and FIG. 8 are perspective top views of the optical arrangement of FIG. 4 illustrating the rays in more detail.
Figure 8:
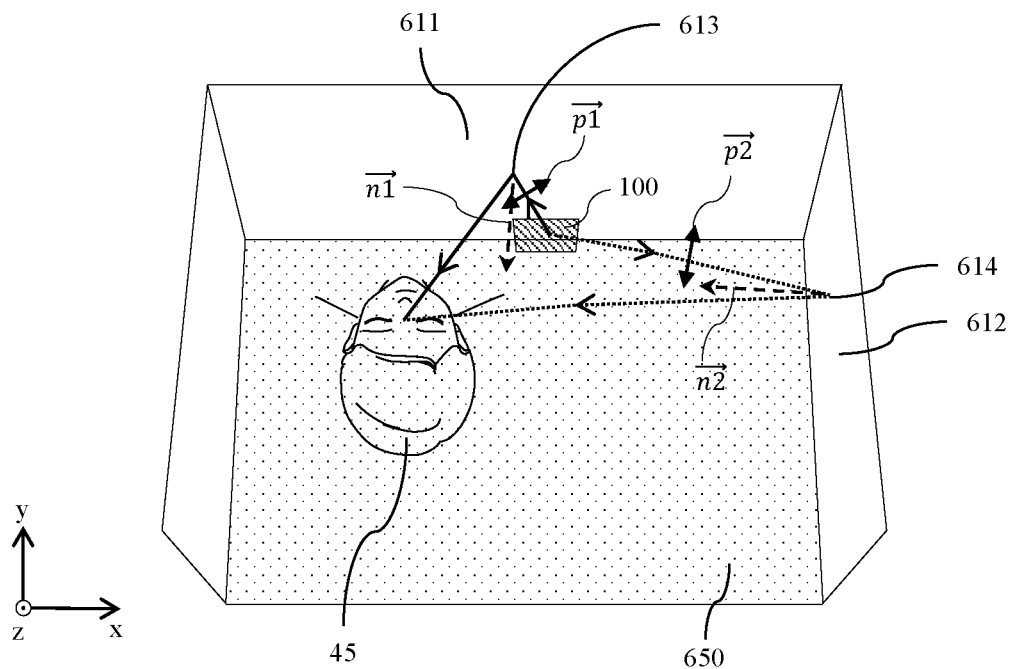

This is illustrated in FIGS. 7-8 which are perspective views of an example of the optical arrangement of FIG. 4 being a vehicle 650 in which the first surface 611 is the windshield of the vehicle 650 and the second surface 612 is a side window of the vehicle 650. FIG. 7 illustrates the first and second rays of light r1 and r2 output from the display device 100 and FIG. 8 the p-polarization states of the first and second rays of light r1 and r2.

Such selection of the first and second optical retarders 801 and 802 is possible because a desired polarization state for a particular ray of a particular wavelength can always be transformed from any input polarization state with an optical retarder whose optical axis and retardance are freely selected.

Introducing a temporal phase shift between polarization components cause their amplitudes to add at different times creating a temporally varying electric field direction thus transforming the linear state into a more general elliptical one. A retarder introduces a relative phase shift between components by selectively slowing down the polarization component aligned with its optical axis. A half-wave phase shift forces the original components to be completely out-of-phase resulting in a linear polarization state whose direction is the reflected original about the projection of the optical axis of the optical retarder.

Figure 9:
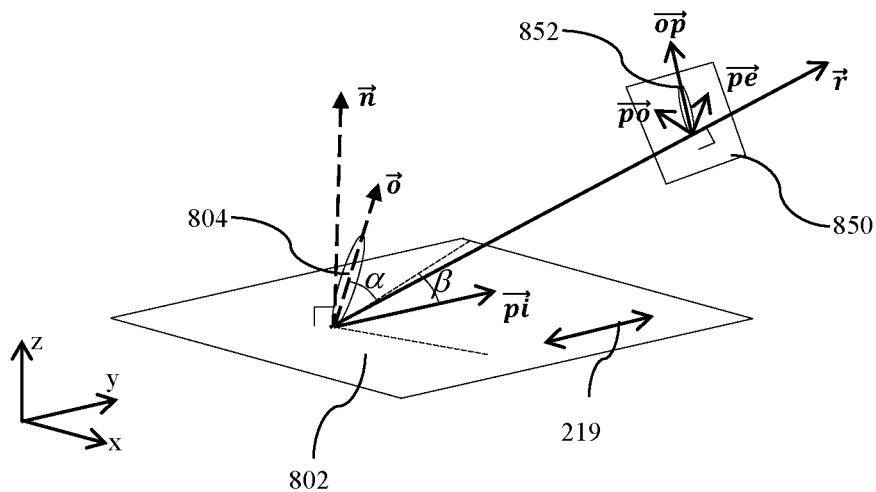
FIG. 9 is a perspective view of an optical retarder showing an example of how the polarisation state of a ray of light is controlled.

FIG. 9 is a perspective view of the second optical retarder 802 showing an example of how the polarisation state of a ray of light is controlled, as follows.

The second optical retarder 802 has an optical axis o which lies at an acute angle $\alpha$ to the plane of the second optical retarder 802. The electric vector transmission direction 219 of the output polariser 218 is shown and light output from the display device 100 along the normal n to the plane of the second optical retarder 802 is linearly polarised in a direction pi of linear polarisation that is parallel thereto. The projection of the direction of the optical axis o of the second optical retarder 802 onto the plane of the second optical retarder 802 has an azimuth angle $\beta$ to the direction pi of linear polarisation.

A ray of light r output from the display device 100 is considered and a plane 850 normal to that ray of light r is shown. The ray of light r has an initial direction pe of linear polarisation which is the projection of the direction pi of linear polarisation onto the plane 850.

The projection 852 of the birefringent molecules 804 onto the plane 850 and the projection op of the optical axis o onto the plane 850 are also both shown. The second optical retarder 802 provides a phase shift that transforms the polarisation state of the ray of light r in accordance with the projection op of the optical axis o onto the plane 850. In this example, the second optical retarder 802 provides a half-wave retardance at a wavelength of 550 nm along the second ray of light r. In that case, the second optical retarder 802 transforms the polarisation state of the ray of light r by changing the direction of linear polarisation from the initial direction pe to a final direction po, wherein the projection op of the optical axis o onto the plane 850 bisects the initial direction pe and the final direction po. This is often referred to as a "rotation" of the direction of linear polarisation, although strictly speaking it is a transformation of the direction of linear polarisation through elliptical polarisation states.

Herein, all materials are assumed to have a refractive index of one for clarity of description. That is unrealistic, but the actual refractive indices may be accounted for by transforming the polarization states and ray directions at each interface, requiring extra but orthodox computation.

As a result, it is possible to select optical retarders to independently control the polarisation state of the first and second rays of light r1 and r2. In fact, there are an infinite number of such solutions since the optical axes of any one solution can have an arbitrary component along the direction of the ray. Mathematically this falls out of the three degrees of freedom possessed by an arbitrary optical retarder to provide the required two dimensional polarization manipulation.

By the same argument this restricts a uniaxial optical retarder to the arbitrary manipulation of the polarization state of no more than one ray, unless the polarization transformations of one of the rays requires less restriction on the optical retarder. Such a case occurs when a linear polarization state is retained for one of the rays. Here any retarder having no component orthogonal to both ray and preserved linear polarization directions may be selected. This reduced restriction frees up two degrees of freedom for an arbitrary transformation of a second ray. Recognizing this provides a general method of providing any polarization state for any two given rays using the general approach as follows.

To maintain an original polarization state for certain rays while transforming others, it is possible to select an optical retarder to have an optical axis having different projected retarder orientations with respect to the initial polarization direction for the first and second rays of light r1 and r2. Maintaining the polarization of the first ray of light r1 in a given plane can be achieved by restricting the optical axis of the second optical retarder 802 to lie within that given plane. The angle of the optical axis of the second optical retarder 802 within that plane and the retardance of the second optical retarder 802 are then selected so that the projection of the optical axis onto the normal to the second ray of light r2 provides the desired transformation of the second ray of light r2. This will now be described in more detail with reference to FIGS. 10-11.

Figure 10:
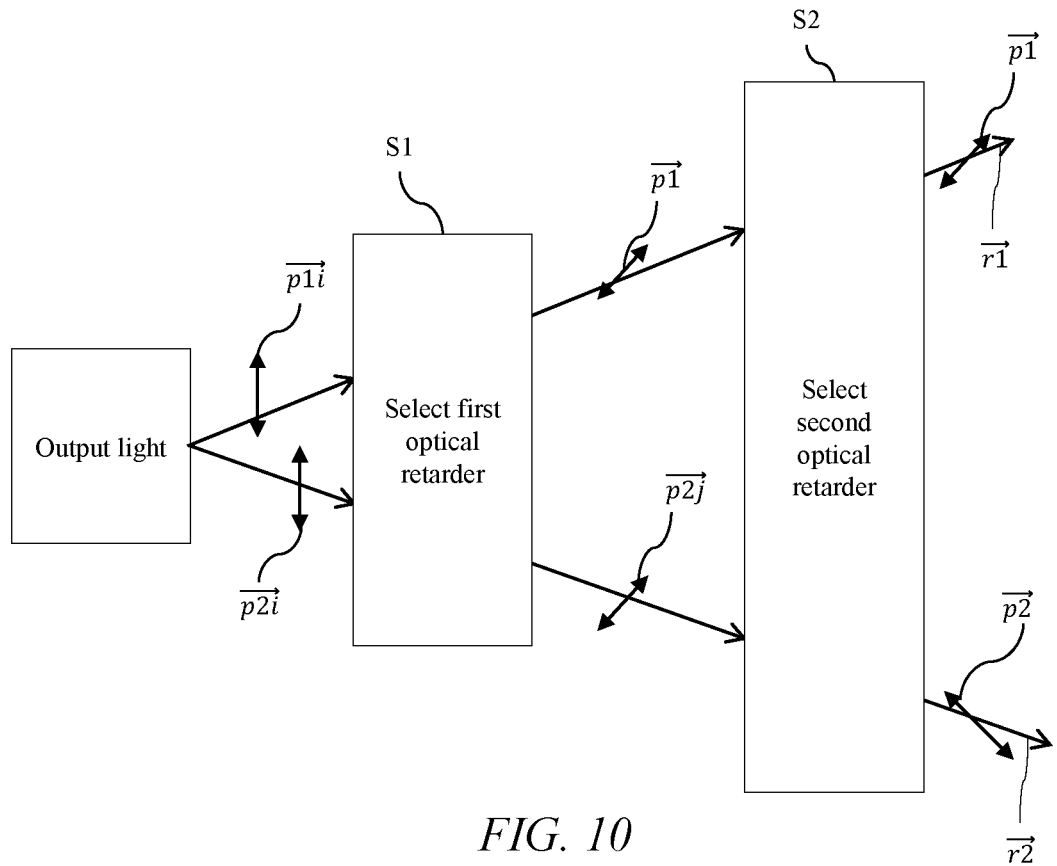
FIG. 10 is a chart illustrating a method for selection of the optical retarders for output light having a predetermined polarization state of being linearly polarized in a direction in the first plane of incidence.

FIG. 10 is a chart illustrating a method for selection of the optical retarders in the display device 100 of FIGS. 1-2 including first and second optical retarders 801 and 802. This method is applicable in the case that the light output from the display device 100 has a predetermined polarization state of being linearly polarized in an arbitrary direction which is not in the first plane of incidence.

The first ray of light r1 output from the display device 100 has an initial polarisation state p1$i$ and the second ray of light r2 output from the display device 100 has an initial polarisation state p2$i$.

In step S1, the first optical retarder 801 is selected to transform the direction of linear polarization of the first ray of light r1 that is present on output from the display panel 101 (initial polarisation state p1$i$) from into the first plane of incidence (p-polarisation state p1). As discussed further below, the second optical retarder 802 does not transform the direction of linear polarization of the first ray of light r1, so the first optical retarder 801 has the same properties whether before the second optical retarder 802 in the example of FIG. 1 or after the second optical retarder 802 in the example of FIG. 2.

Step S1 is performed by selecting the optical axis of the first optical retarder 801 to have a projection onto a plane normal to the first ray of light r1 which bisects (a) the direction of linear polarization of the first ray of light r1 output from the display device 100 and (b) the first plane of incidence.

The first optical retarder 801 has an optical axis parallel to the plane of the first optical retarder 801 and for optical retarders of this type, the optical transformation may be a good approximation to isotropic with angle for many common uniaxial materials. In such cases, selection of the first optical retarder 801 may be simplified by having regard merely to the transformation of a ray normal to the plane of the first optical retarder 801. In this case, the optical axis of the first optical retarder 801 may be selected to bisect (a) the direction of linear polarization of a normal ray of light output in a normal direction to the display device 100 and (b) the first plane of incidence.

Step S1 is also performed by selecting the first optical retarder 801 to provide a half-wave retardance at a design wavelength, typically of 550 nm, along the first ray of light r1. As discussed above with reference to eqn. 1, the retardance may be controlled by selection of the birefringence $\Delta n$ and the thickness d of the first optical retarder 801. Where selection of the first optical retarder 801 is simplified by having regard merely to the transformation of a ray normal to the plane of the first optical retarder 801, then the first optical retarder 801 may similarly be selected to provide a half-wave retardance at the design wavelength along the normal to the first optical retarder 801.

In step S2, the second optical retarder 802 is selected to achieve the following effects.

The first effect is that the second optical retarder 802 does not transform the direction of linear polarization of the first ray of light r1 that is incident thereon. This effect is achieved by the second optical retarder 802 being selected to have an optical axis o which lies at an acute angle $\alpha$ to the plane of the second optical retarder 802 and in a plane containing the first ray of light r1 and the direction of polarization of the first ray of light r1 that is incident on the second optical retarder 802. As a result of the optical axis o lying in this plane, the projection of the optical axis o onto plane normal to the first ray of light r1 is aligned with the direction of linear polarization of the first ray of light r1, so does not transform the polarisation state of the first ray of light r1.

However, the azimuth angle $\beta$ of the optical axis o about the normal to the second optical retarder 802 depends on whether the second optical retarder 802 is before or after the first optical retarder 801.

In the case of FIG. 1 that the second optical retarder 802 is after the first optical retarder 801, then the polarisation state of the first ray of light r1 has been transformed into the first plane of incidence. Accordingly, in this case, the optical axis o of the second optical retarder 802 is arranged to lie in the first plane of incidence.

In the case of FIG. 2 that the second optical retarder 802 is before the first optical retarder 801, then the polarisation state of the first ray of light r1 remains in the initial polarisation state p1$i$ of the first ray of light r1 output from the display panel 101. Accordingly, in this case, the optical axis o of the second optical retarder 802 is arranged to lie in a plane containing the first ray of light r1 and the direction of polarization of the initial polarisation state p1$i$.

The second effect is that the second optical retarder 802 transforms the direction of linear polarization of the second ray of light r2 that is incident thereon into a predetermined direction such that the first and second optical retarders 801 and 802 together transform the direction of linear polarization of the second ray of light r2 into the second plane of incidence.

The second effect of Step S2 is achieved by selecting the optical axis o of the second optical retarder 802 to have a projection onto a plane normal to the second ray of light r2 which bisects (a) the direction of linear polarization of the second ray of light r2 that is incident thereon, and (b) the predetermined direction.

The acute angle α between the optical axis o of the second optical retarder 802 and the plane of the second optical retarder 802 depends on whether the second optical retarder 802 is before or after the first optical retarder 801.

In the case of FIG. 1 that the second optical retarder 802 is after the first optical retarder 801, then the direction of linear polarization of the second ray of light r2 has already been transformed by the first optical retarder 801 before being incident on the second optical retarder 802, and the predetermined direction into which the direction of the linear polarisation is transformed is the final direction in the second plane of incidence. Accordingly, in this case the optical axis o of the second optical retarder 802 has a projection onto a plane normal to the second ray of light r2 which bisects (a) the direction of linear polarization of the second ray of light r2 after transformation by the first optical retarder 801 and (b) the second plane of incidence.

In the case of FIG. 2 that the second optical retarder 802 is before the first optical retarder 801, then the polarization state of the second ray of light r2 remains in the initial polarisation state p2i of the second ray of light r2 output from the display panel 101 and the predetermined direction is determined taking into account the subsequent transformation of the second ray of light r2 by the first optical retarder 801, i.e. such that the first optical retarder 801 transforms the predetermined direction of the linear polarization of the second ray of light r2 that is incident thereon into the second plane of incidence. Accordingly, in this case, the optical axis o of the second optical retarder 802 has a projection onto a plane normal to the second ray of light r2 which bisects (a) the direction of linear polarization of initial polarisation state p2i of the second ray of light r2 and (b) the predetermined direction so determined.

Step S2 is also performed by selecting the retardance of the second optical retarder 802 to provide a half-wave retardance at a design wavelength, typically of 550 nm, along the second ray of light r2.

Figure 11:
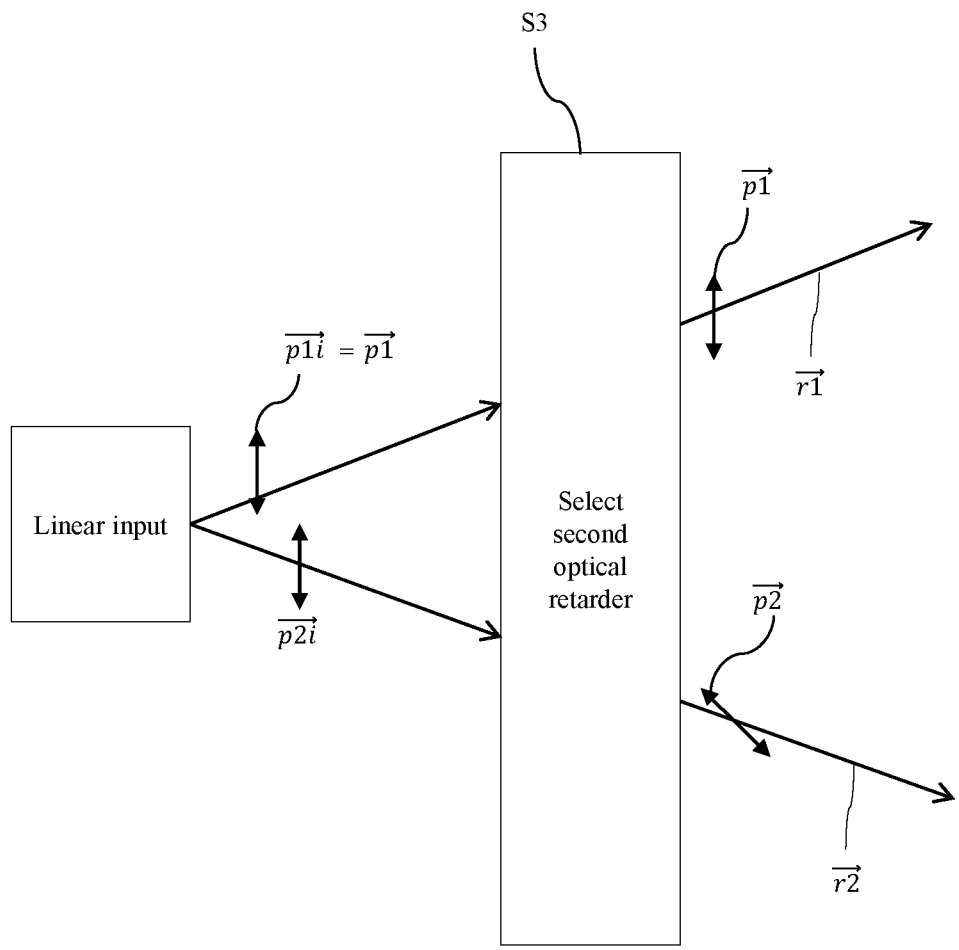
FIG. 11 is a chart illustrating a method for selection of the optical retarders for output light having an arbitrary predetermined polarization state.

FIG. 11 is a chart illustrating a method for selection of the optical retarders in the display device 100 of FIG. 3 including only the second optical retarder 802. This method is applicable in the case that the light output from the display device 100 has a predetermined polarization state of being linearly polarized in a direction in the first plane of incidence. In that case, the first optical retarder 801 is not needed, and the second optical retarder 802 may be selected in a similar manner to the method of FIG. 11.

Specifically, the method comprises a single step S3 in which the second optical retarder 802 is selected to achieve the following effects.

The first effect is that the second optical retarder 802 does not transform the direction of linear polarization of the first ray of light r1 that is output from the display panel 101 and incident thereon. This effect is achieved by the second optical retarder 802 being selected to have an optical axis o which lies at an acute angle α to the plane of the second optical retarder 802 and in the first plane of incidence. As a result of the optical axis o lying in the first plane of incidence, the projection of the optical axis o onto plane normal to the first ray of light r1 is aligned with the direction of linear polarization of the first ray of light r1, so does not transform the initial polarisation state p1i of the first ray of light r1.

The second effect is that the second optical retarder 802 transforms the direction of linear polarization of the second ray of light r2 that is output from the display panel 101 and incident thereon into the second plane of incidence. This is achieved by selecting the optical axis o of the second optical retarder 802 to have a projection onto a plane normal to the second ray of light r2 which bisects (a) the direction of linear polarization of the second ray of light r2 that is output from the display panel 101, and (b) the second plane of incidence.

Figure 12:
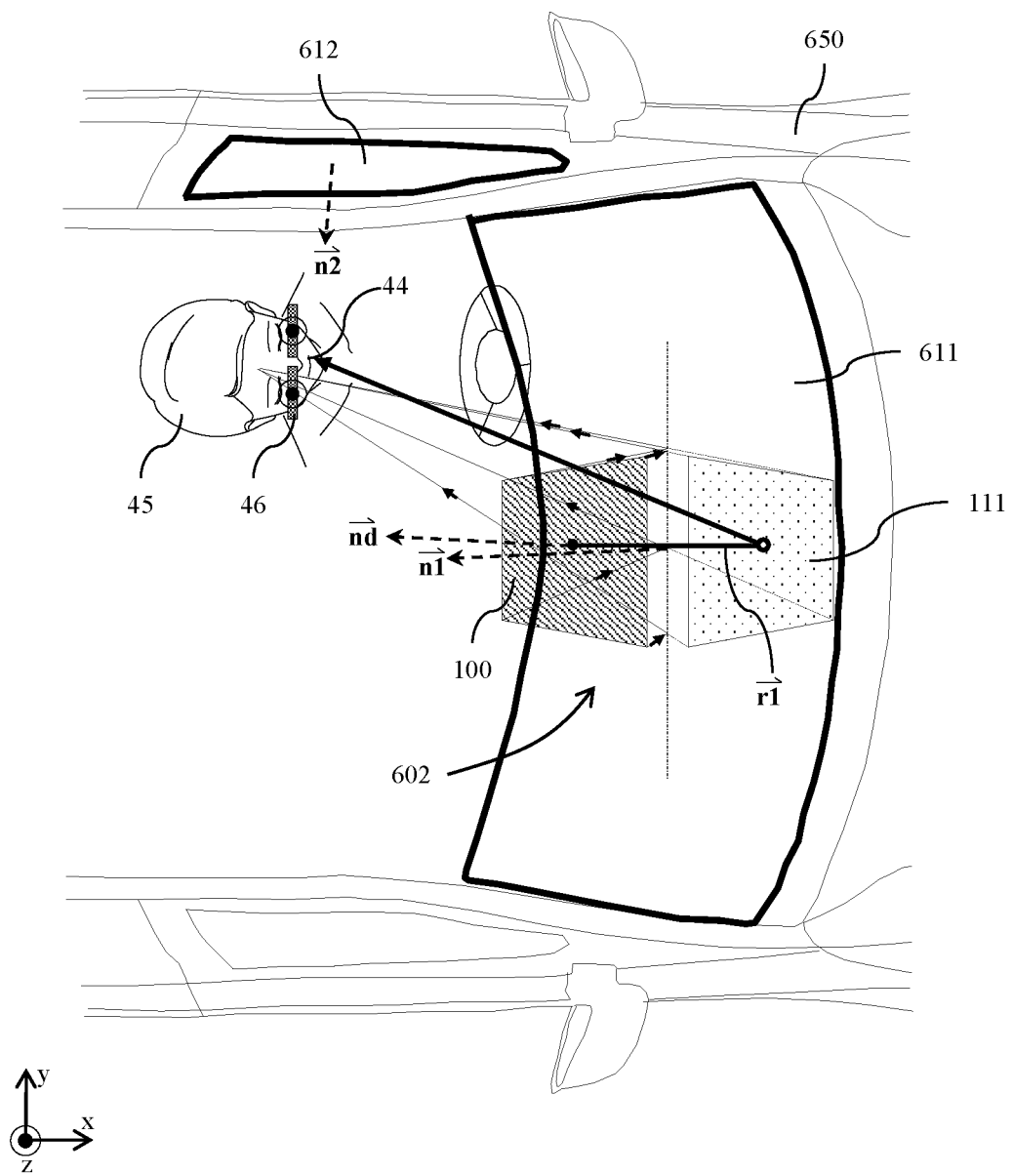
FIG. 12 is a top view of an optical arrangement which is a vehicle including the display device and illustrating a reflection from a first surface which is the windscreen of the vehicle.

The methods shown in FIGS. 11-12 are examples and the first and second optical retarders 801 and 802 may be selected in other manners to provide the same effect. Moreover, the methods may be generalised to selection of the optical retarders for output light having any predetermined polarization state.

An example in which the optical arrangement of FIG. 4 is a vehicle 650 is shown in greater detail in FIGS. 12-17. Herein, the first surface 611 is the windshield of the vehicle 650 and the second surface 612 is a side window of the vehicle 650. The display device 100 is arranged in the dashboard 602 at a central position across the vehicle 650. Features of the embodiments of FIGS. 12-17 not discussed in further detail may be assumed to correspond to the features with equivalent reference numerals as discussed above, including any potential variations in the features.

Figure 13:
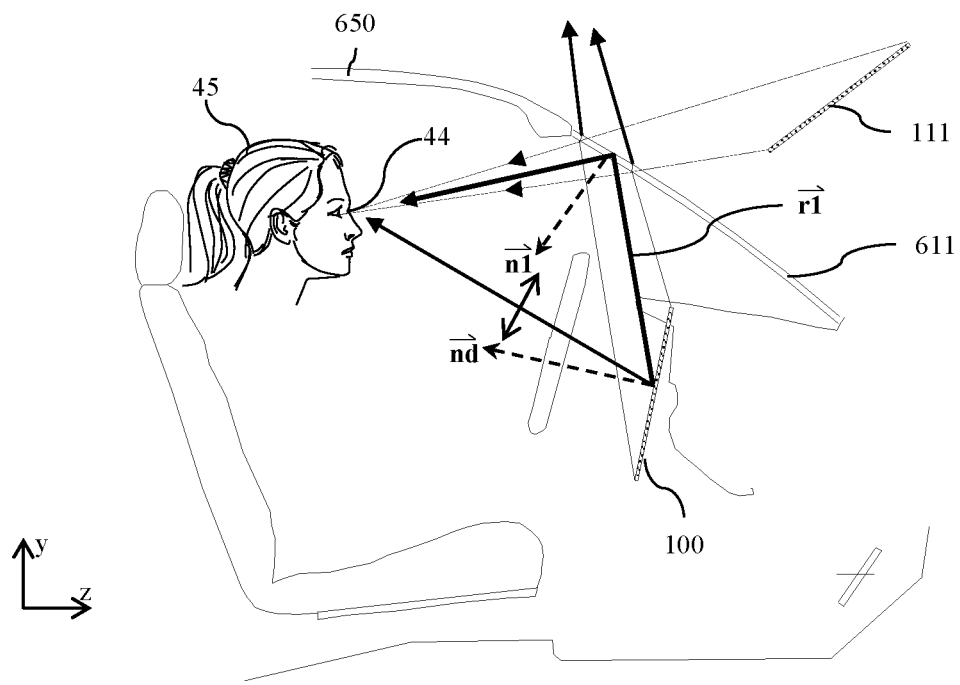
FIG. 13 is a side view of the vehicle shown in FIG. 12 illustrating the reflection from the first surface.
Figure 14:
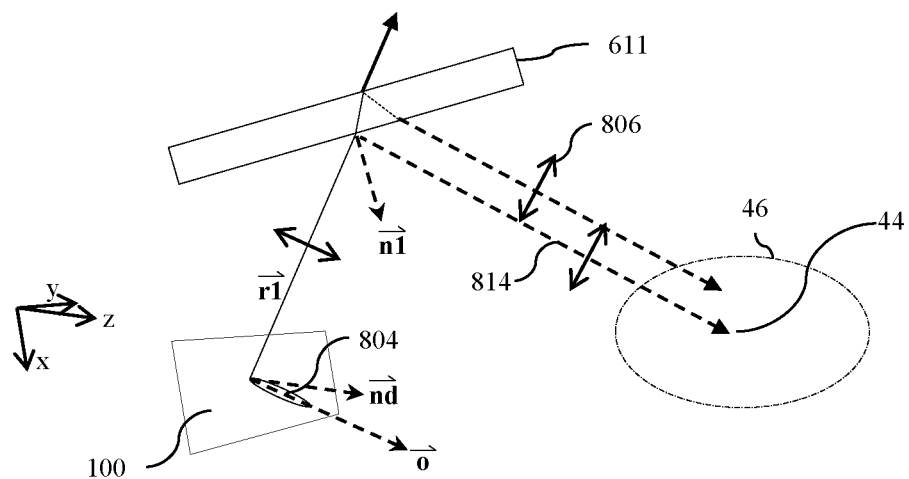
FIG. 14 is a view of the vehicle shown in FIG. 12 in the plane of incidence of the first ray reflected from the first surface.

FIGS. 12-14 illustrate the normal viewing position 44 of the viewer 45 who is the driver of the vehicle, and also a reflection from the first surface 611 (windscreen). In this example, the light output by the display panel 101 is linearly polarized in a vertical direction to match the transmission of anti-glare polarized glasses when worn by the driver 45. The first and second optical retarders 801 and 802 are selected to transform the polarization state of the first ray of light r1 to be in the first plane of incidence, which is close to vertical in this example. This minimizes reflections from the first surface 611 (windscreen) which would otherwise create an image 111 of the display device 100.

Figure 15:
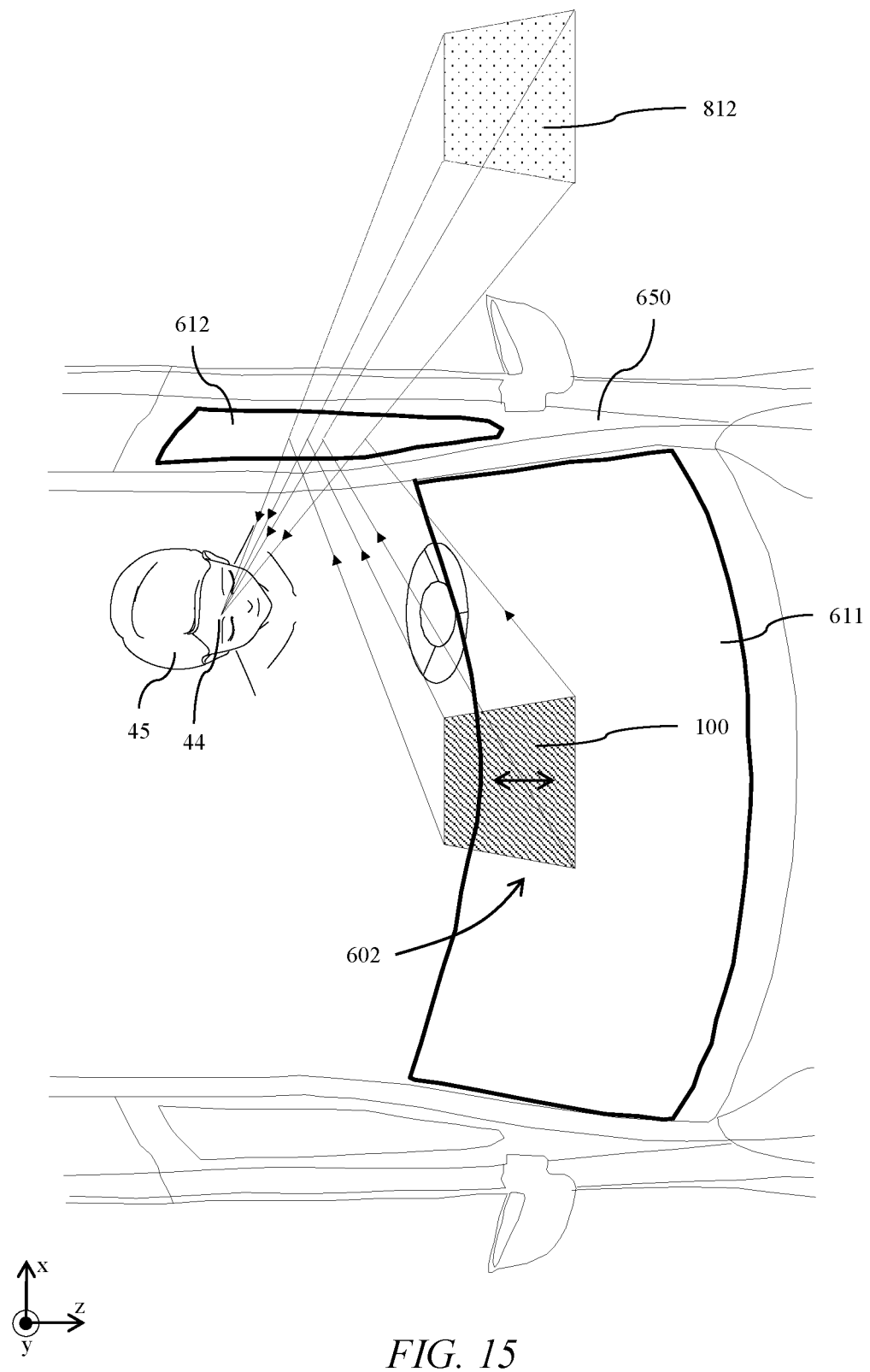
FIG. 15 is a top view of the vehicle shown in FIG. 12 showing the reflection from a second surface which is a side window of the vehicle.
Figure 16:
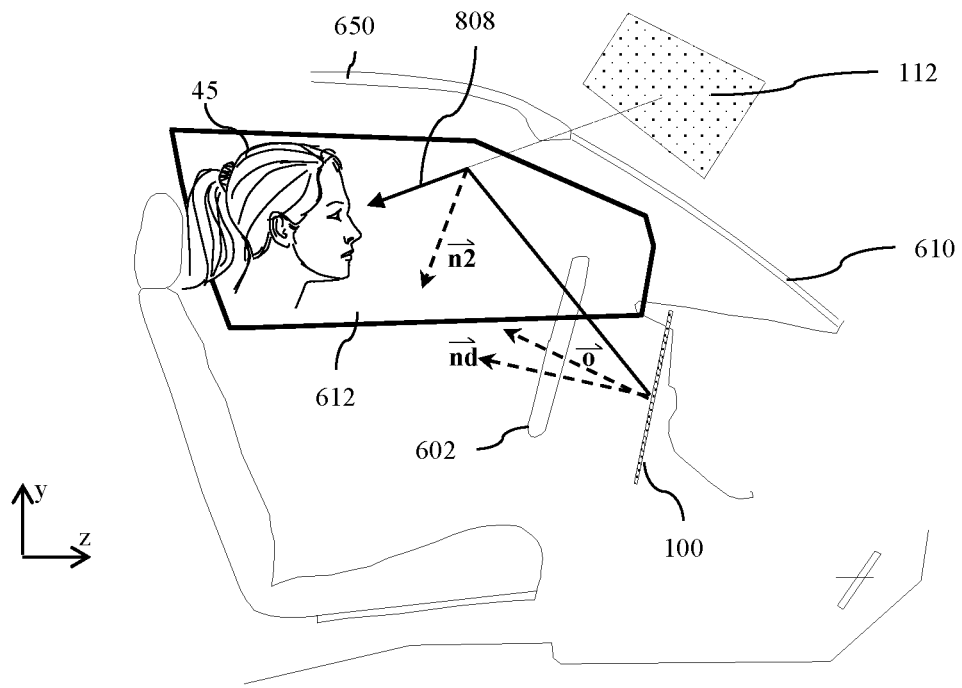
FIG. 16 is a side view of the vehicle shown in FIG. 15 illustrating the reflection from the second surface.
Figure 17:
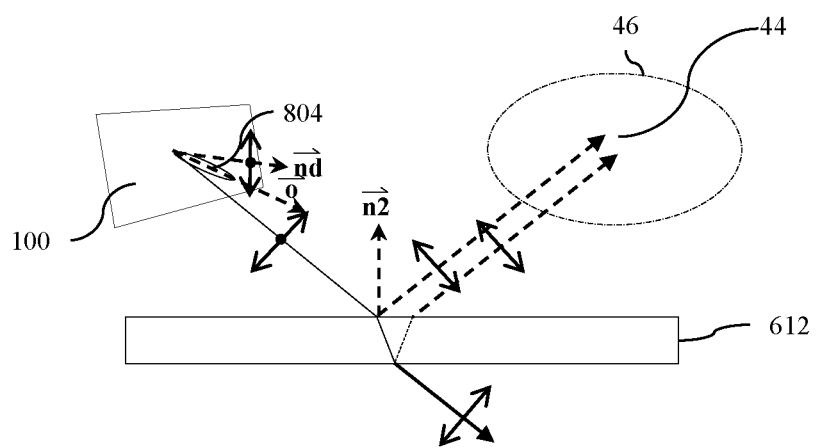
FIG. 17 is a view of the vehicle shown in FIG. 15 in the plane of incidence of the first ray reflected from the second surface.

FIGS. 15-17 illustrate a reflection from the second surface 611 (side window). In this example, as the light output by the display panel 101 is linearly polarized in a vertical direction, then in the absence of the first and second optical retarders 801 and 802 this would be close to an s-polarisation state which would provide relatively large reflectivity, thereby creating an image of the display device 100. However, the first and second optical retarders 801 and 802 are selected to transform the polarization state of the second ray of light r2 to be in the second plane of incidence, which is close to horizontal in this example, thereby reducing these reflections. This minimizes reflections from the second surface 612 (side window) which would otherwise create an image 812 of the display device 100.

Although the display device 100 is configured to minimize reflections at a particular viewing position 44, in fact reflections are reduced by a similar amount across a typical viewing box 46 within which eyes of different drivers are expected to be located.

In all the above examples, the first and second rays of light r1 and r2 are reflected from the first and second surfaces 611 and 612, respectively, to a common viewing position 44. However, the first and second optical retarders 801 and 802 could be selected to reduced reflections of first and second rays of light r1 and r2 are reflected from first and second surfaces 611 and 612 to different locations. That might be useful in various applications, for example to reduce reflections perceived by two viewers in different locations. In this case, the method of selecting the first and second optical retarders 801 and 812 is the same, except for the first and second planes of incidence being differently defined.

Figure 18:
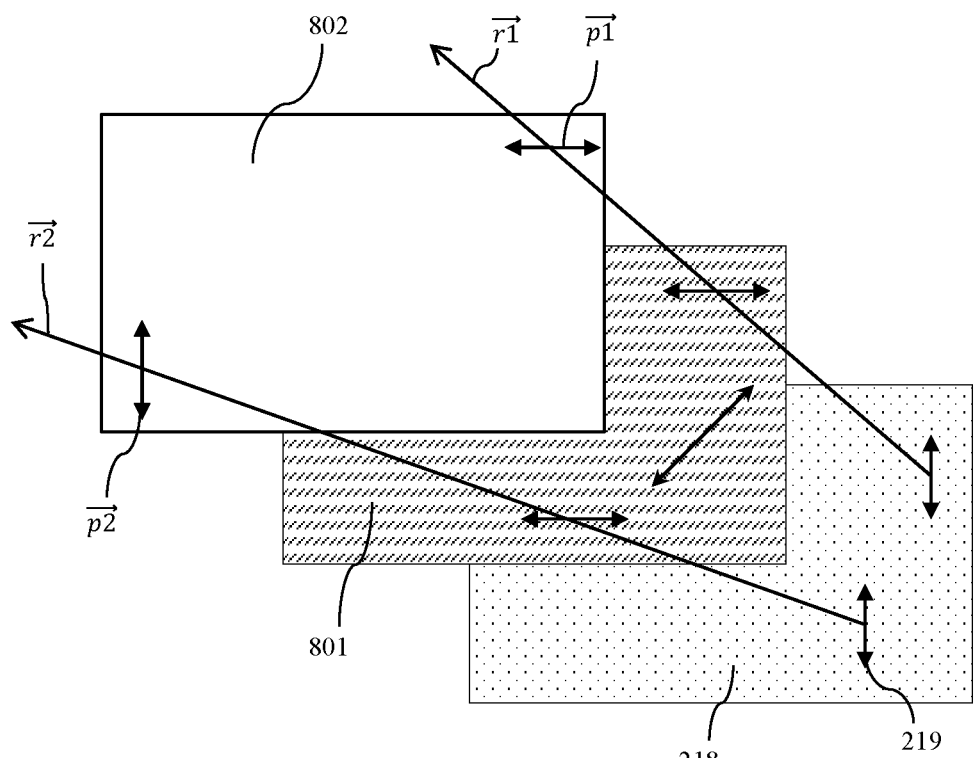
FIG. 18 is a front view of a second example of the optical stack of the display device of FIG. 1 illustrating the polarization states of the rays of light.

FIG. 18 is a front view of an example of the optical stack of the display device 100 of FIG. 1 in which the first optical retarder 801 is arranged before the second optical retarder 802, and illustrating the polarization states of the first and second rays of light r1 and r2. In this example, the electric vector transmission direction 219 is vertical, the first plane of incidence is horizontal and the second plane of incidence is vertical. Accordingly, the first optical retarder 801 is selected to transform the direction of linear polarization of the first ray of light r1 to be horizontal, and so also transforms the direction of linear polarization of the second ray of light r2 to be horizontal. Therefore, the second optical retarder 802 is selected to transform the direction of linear polarization of the second ray of light r2 from that horizontal direction to be vertical.

Figure 19:
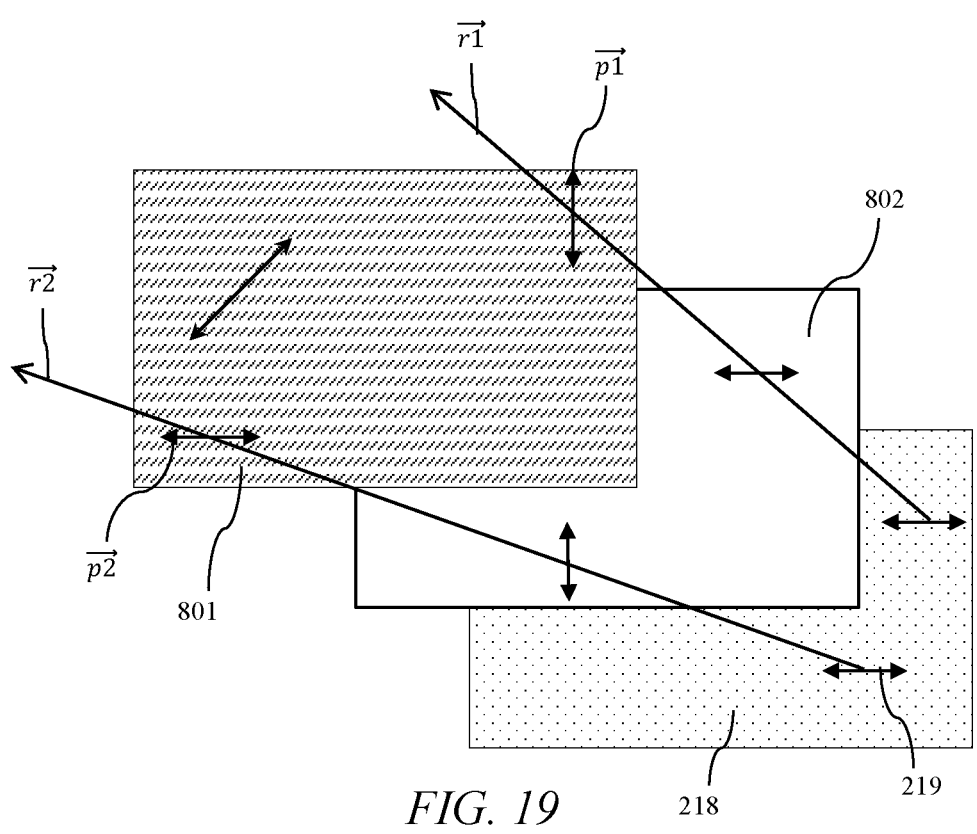
FIG. 19 is a front view of a second example of the optical stack of the display device of FIG. 2 illustrating the polarization states of the rays of light.

FIG. 19 is a front view of a second example of the optical stack of the display device 100 of FIG. 2 in which the first optical retarder 801 is arranged after the second optical retarder 802, and illustrating the polarization states of the first and second rays of light r1 and r2. In this example, the electric vector transmission direction 219 is horizontal, the first plane of incidence is vertical and the second plane of incidence is horizontal. Accordingly, the first optical retarder 801 is selected to transform the direction of linear polarization of the first ray of light r1 to be vertical and so will perform a predictable transformation of the second ray of light r2. Therefore, the second optical retarder 802 is selected to transform the direction of linear polarization of the second ray of light r2 from the horizontal direction to a predetermined direction which is vertical, so that the subsequent transformation of the second ray of light r2 by the first optical retarder 801 is from that vertical direction to horizontal direction.

The display device 100 may be of any type. Some non-limitative examples are as follows. The display panel 101 may be a simple instrument display panel. The display panel 101 may comprise a spatial light modulator (SLM). Such an SLM may be an emissive SLM, for example comprising light emitting diodes that may be organic (OLED) or inorganic (micro-LED) or combination of inorganic and organic. Alternatively, such an SLM may be a transmissive SLM, for example being an LCD display panel, in which case the display panel may further comprise a backlight arranged to illuminate the SLM.

Features of the embodiments of FIGS. 18-19 not discussed in further detail may be assumed to correspond to the features with equivalent reference numerals as discussed above, including any potential variations in the features.

Figure 20:
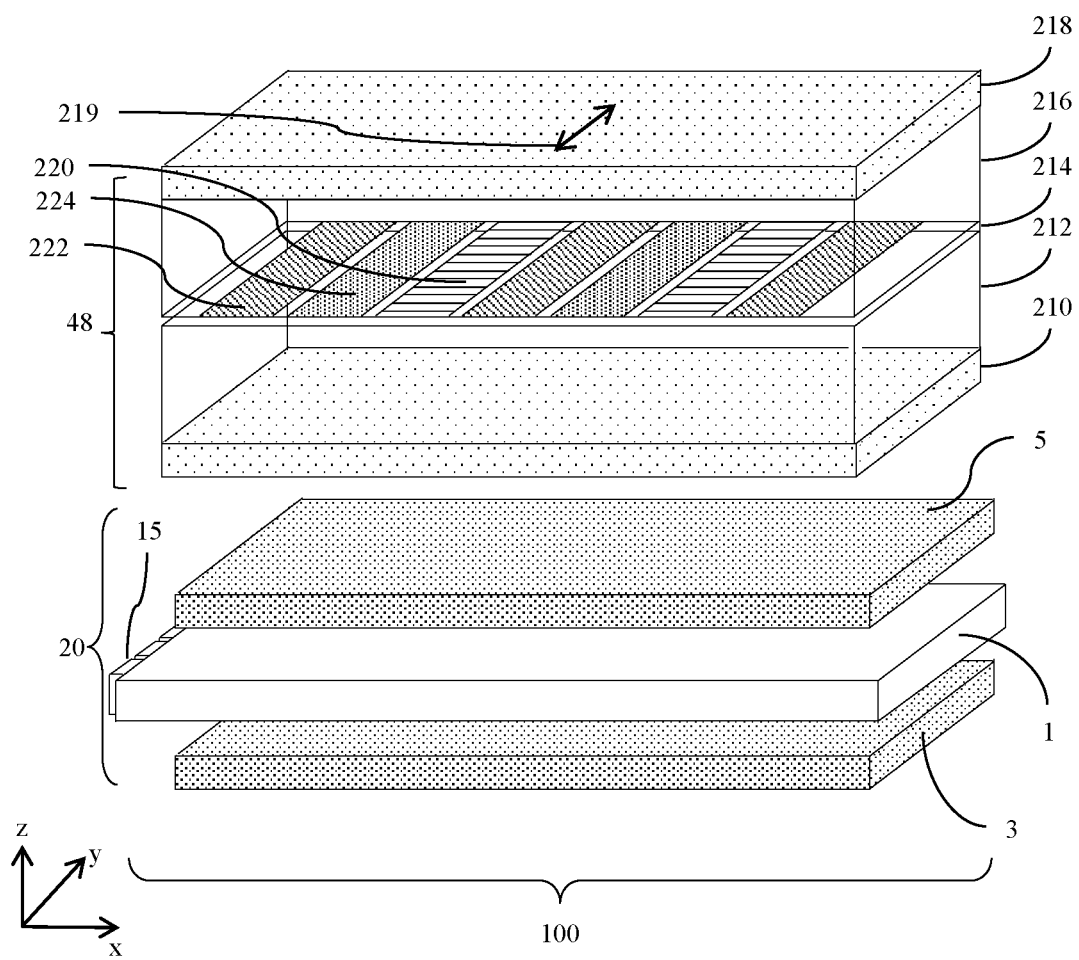
FIG. 20 is a side perspective view of the display panel in the display devices of FIGS. 1-3.

FIG. 20 is a side perspective view of an example of the display panel 101 in the display devices 100 of FIGS. 1-3 that comprises a transmissive SLM 48 and a backlight 20 arranged to illuminate the SLM 48.

The SLM 48 comprises comprise a liquid crystal display comprising substrates 212, 216, liquid crystal layer 214 and red, green and blue pixels 220, 222, 224. The SLM 48 further comprises an input polariser 210 arranged on the input side of the SLM 48, as well as the output polariser 218 arranged on the output side of the SLM 48. The input polariser 210 and the output polariser 218 are each linear polarisers.

The backlight 20 comprises input light sources 15, a waveguide 1, a rear reflector 3 and an optical stack 5 comprising diffusers, light turning films and other known optical backlight structures. Asymmetric diffusers, that may comprise asymmetric surface relief features for example, may be provided in the optical stack 5 with increased diffusion in the elevation direction in comparison to the lateral direction may be provided. Advantageously, image uniformity may be increased.

The first and second optical retarders 801 and 802 (or more generally all the optical retarders) may be of any type.

The second optical retarder 802 that has an optical axis out of the plane of the second optical retarder may have an optical axis that has a uniform direction through its thickness. Alternatively, the first optical retarder 802 may have an optical axis that is splayed through its thickness. For the sake of simplicity, the above description describes the effect of the first and second optical retarders 801 and 802 for the case that they have an optical axis that is uniform through their thickness. In the case that the optical axis is splayed through the thickness of the first and second optical retarders 801 and 802, the optical effect is more complex in that the effect of successive layers must be considered, but this may be modelled using conventional techniques that allow the first and second optical retarders 801 and 802 to be selected to provide the effects disclosed herein.

The first and second optical retarders 801 and 802 may be passive retarders or may be electrically switchable between at least two modes, in any combination. In the case that either or both of the first and second optical retarders 801 and 802 is electrically switchable, then they are selected to have the effects described herein in at least one of the electrically switchable modes. This allows the display device 100 to be switchable between different states, for example between two state which each provide control of different reflections, or between a states which do and do not provide control of reflections.

In one example, each of the first and second optical retarders 801 and 802 are passive retarders, for example being formed of cured liquid crystal material or stretched polymer films.

In another example, the first optical retarder 801 is a passive retarder and the second optical retarder 802 is electrically switchable between at least two modes.

Figure 21:
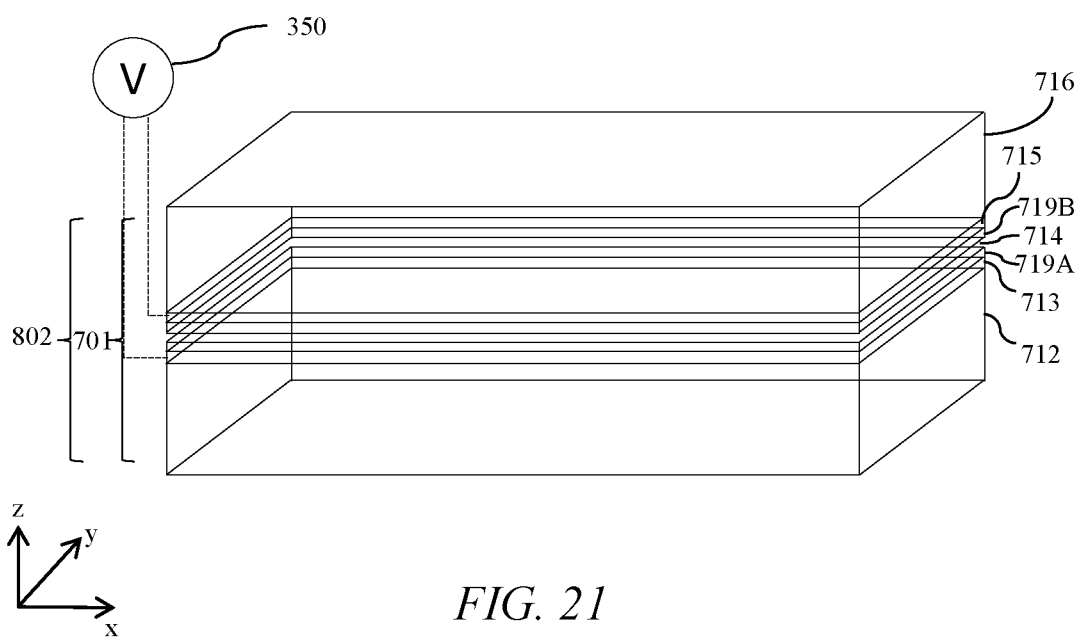
FIG. 21, FIG. 22, and FIG. 23 are side perspective views of three alternative examples of an optical retarder in the display devices of FIGS. 1-3.
Figure 22:
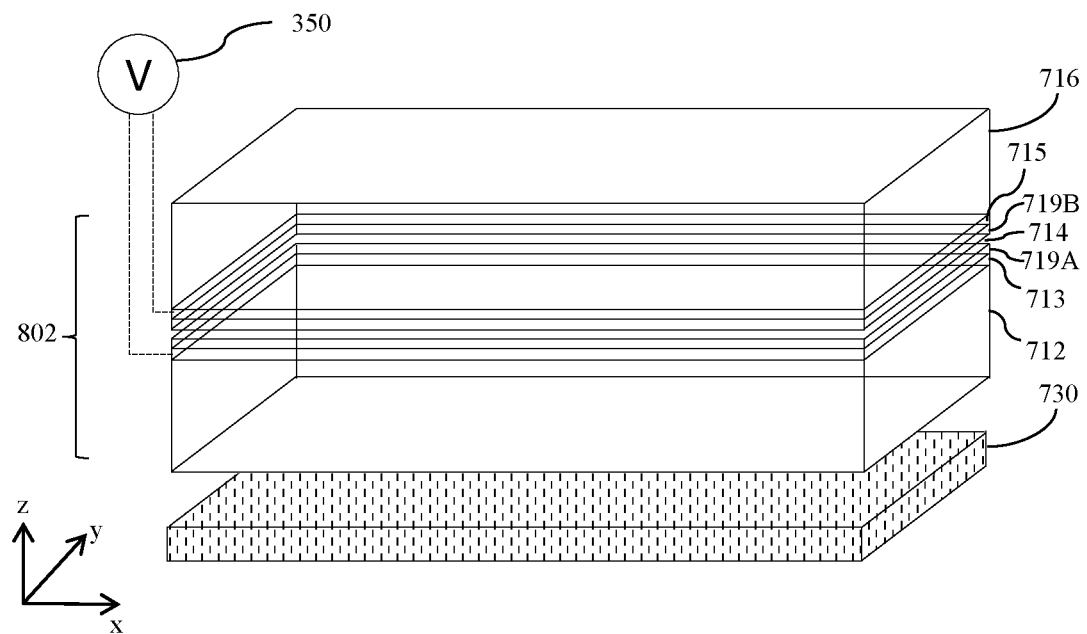
Figure 23:
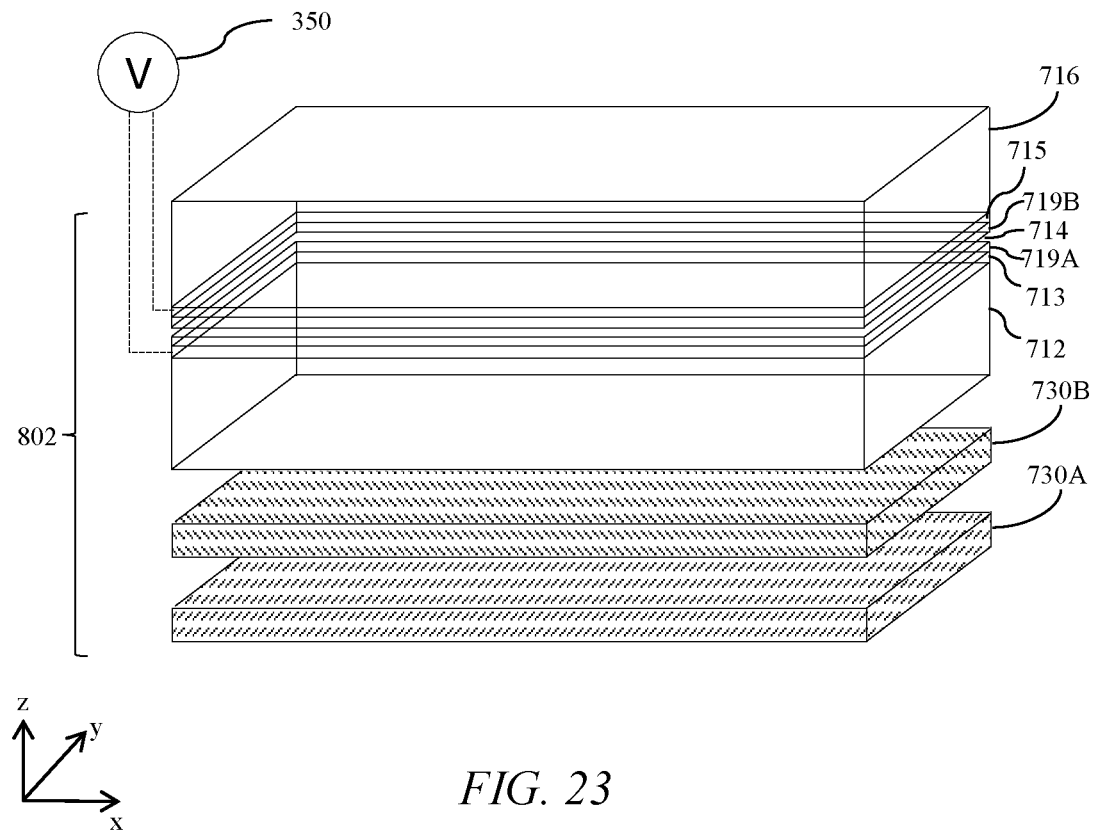

FIG. 21-23 side perspective views of three alternative examples of the second optical retarder 802 in the display devices 100 of FIGS. 1-3. In each example, the second optical retarder 802 have common elements as follows.

In each example, the second optical retarder 802 includes a layer 714 of liquid crystal material dispose between two substrates 712 and 716. The substrates 712 and 716 support respective electrodes 713 and 715 arranged to provide a voltage across the layer 714 of liquid crystal material for controlling the layer 714 of liquid crystal material. A control system 350 is connected to the electrodes 713 and 715, and is arranged to control the voltage applied thereacross.

The second optical retarder 802 also includes two surface alignment layers 719A and 719B disposed adjacent to the layer 714 of liquid crystal material and on opposite sides thereof. Each of the surface alignment layers 719A and 719B is arranged to provide alignment in the adjacent liquid crystal material, for example homeotropic alignment or homogenous alignment, for providing the second optical retarder 802 with appropriate properties.

In the example of FIG. 21, the second optical retarder 802 comprises no further retarder layers.

In the example of FIG. 22, the second optical retarder 802 comprises a passive retarder layer 730 having an optical axis perpendicular to the plane of the second optical retarder 802, i.e. a C-plate.

In the example of FIG. 23, the second optical retarder 802 comprises two passive retarder layers 730A and 730B that have optical axes in the plane of the second optical retarder 802 and crossed with respect to each other, i.e. crossed A-plates.

Other passive retarder layers may similarly be included in the second optical retarder 802. The use of such passive retarder layers allows the angular dependence of the retardance of the second optical retarder 802 to be adapted, for example to increase the range of angles over which a particular retardance is provided.

An illustrative embodiment of the arrangement of FIG. 23 will now be described.

Figure 24:
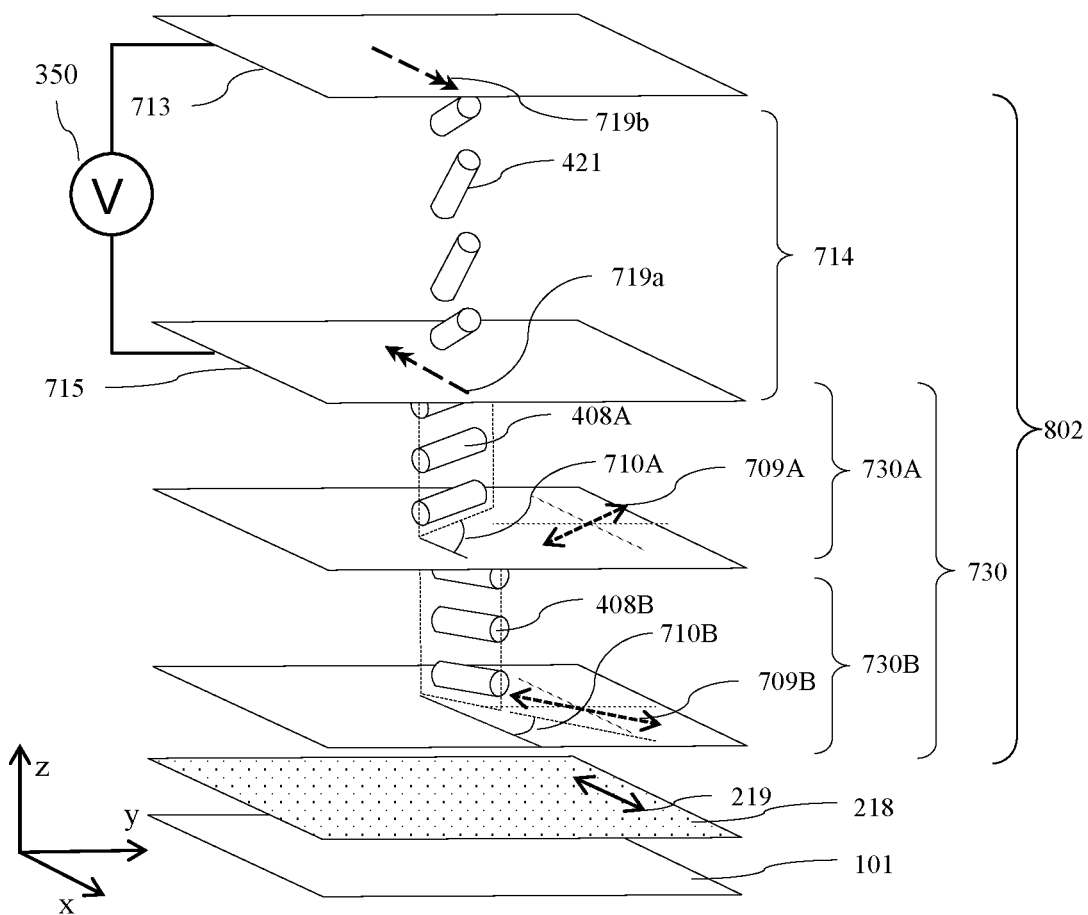
FIG. 24 is a side perspective view of the second optical retarder of FIG. 23.

FIG. 24 is a side perspective view of the second optical retarder 802, output polariser 218 and display panel 101 of FIG. 23. View angle compensation retarder 730 comprises passive A-plates 730A, 730B that comprise birefringent molecules 408A, 408B. The optical axes 709A, 709B of A-plates 730A, 730B are arranged at angles 710A, 710B of +/45 degrees to the electric vector transmission direction 219 of the polariser 218. Active liquid crystal layer 714 comprises liquid crystal molecules 421 that may be driven to splayed state.

Figure 25:
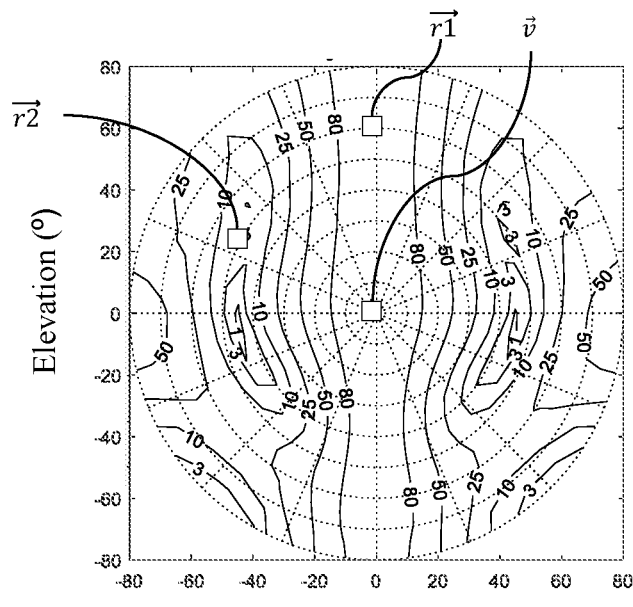
FIG. 25 is a graph illustrating the variation of luminance with polar direction for the second optical retarder of FIG. 24 further comprising an illustrative analysing output polariser.

FIG. 25 is a graph illustrating the variation of luminance with polar direction for the second optical retarder 802 of FIG. 24. The operation of the passive retarders 730 and active retarder 714 in a driven state, output is shown with a further polarisation state analysing polariser provided to receive light from the second retarder 802. In operation, the further polarisation state analysing polariser is not provided, and is used here for illustrative purposes only. The polarisation state analysing polariser provides illustration of output operation by converting polarisation state transformation into a measurable luminance. Thus a high luminance in FIG. 25 illustrates a small polarisation transformation, and a low luminance illustrates a high polarisation transformation, that is a high retardance of the polariser at a given polar angle.

Polar locations of rays r1 and r2 are shown in an illustrative example for a display located in front of the driver and orthogonal first and second planes of incidence. In comparison to arrangements without passive retarders 730, the polar area over which desirable polarisation rotation may be increased. The size of the viewing box 46 for which desirable polarisation transformation is achieved may be increased. Advantageously freedom of driver or passenger location for reduced window reflections may be increased.

Viewing position vector v that in this illustrative example is on-axis is also provided with no polarisation transformation. Advantageously an observer wearing polarised sunglasses may see a high contrast, bright image.

Figure 26:
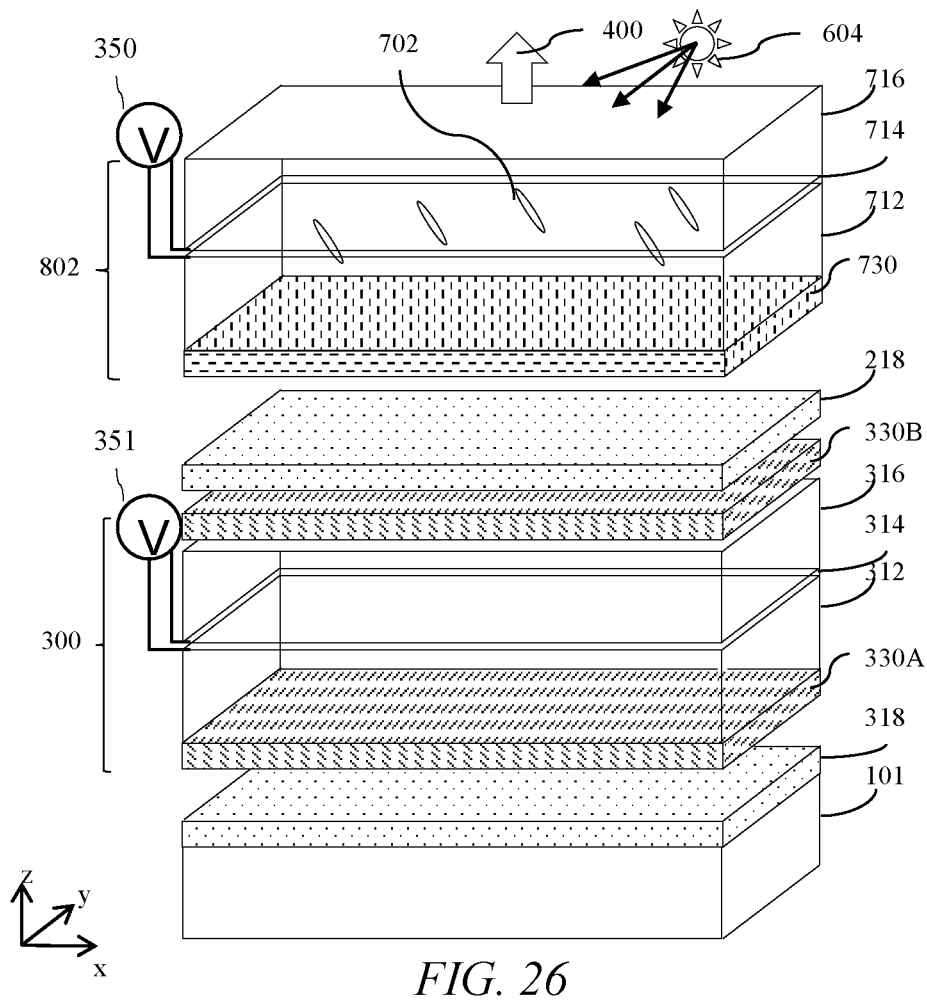
FIG. 26 is a perspective view of view angle control optical retarders that may be applied in the display panel of FIG. 1.

FIG. 26 is a perspective view of optical retarders that may be applied in the display panel 100 of FIG. 1. Features of the embodiment of FIG. 26 not discussed in further detail may be assumed to correspond to the features with equivalent reference numerals as discussed above, including any potential variations in the features.

Display panel 101 comprises additional polariser 318 and view angle luminance control retarder 300 arranged between the additional polariser 318 and output polariser 218. View angle luminance control retarder 300 comprises a layer 314 of liquid crystal material dispose between two substrates 312 and 316. The substrates 312 and 316 support respective electrodes (not shown) arranged to provide a voltage across the layer 314 of liquid crystal material for controlling the layer 314 of liquid crystal material. A control system 351 is connected to the electrodes, and is arranged to control the voltage applied thereacross.

The view angle luminance control retarder 300 also includes two surface alignment layers (not shown) disposed adjacent to the layer 314 of liquid crystal material and on opposite sides thereof. Each of the surface alignment layers is arranged to provide alignment in the adjacent liquid crystal material, for example homeotropic alignment or homogenous alignment, for providing the view angle luminance control retarder 300 with appropriate properties.

The view angle luminance control retarder 300 also comprises passive retarders. In an illustrative embodiment of FIG. 26, the passive retarders comprise quarter waveplates 330A, 330B arranged on opposite sides of the liquid crystal layer 314, and the layer 314 comprises a twisted liquid crystal material.

Figure 27:
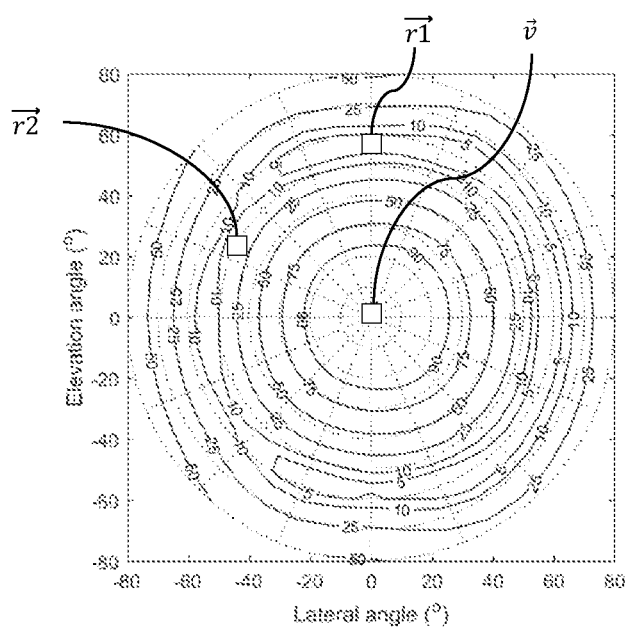
FIG. 27 is a graph illustrating the variation of luminance with polar direction for the view angle control retarder of FIG. 26.

FIG. 27 is a graph illustrating the variation of luminance with polar direction for the view angle control retarder 300 of FIG. 26. The graph illustrates the polar variation of output luminance provided by the polarisers 218, 318. This is different to the polar variation of polarisation transformation illustrated in FIG. 25 in which for measurement purposes only an additional analysing polariser is provided.

In a driven state of the liquid crystal layer 314 the luminance profile is provided with a degree of rotational symmetry. Thus for the ray directions r1 and r2, the luminance is reduced. Comparing with FIG. 25, for light ray r1 the polarisation state is not transformed and the luminance is reduced and for light ray light ray r2 the polarisation state is transformed and the luminance is reduced. Advantageously light ray reflections from windscreen 610 and side window 612 are reduced by means of luminance reduction, and reduction of Fresnel reflectivity. For night operation, display reflection visibility is substantially reduced.

Viewing position vector v is also provided with minimal luminance reduction. Advantageously a bright image may be observed.

Switchable directional display apparatuses for use in privacy display for example and comprising plural retarders arranged between a display polariser and an additional polariser are described in U.S. Patent Publ. No. 2019-0086706, herein incorporated by reference in its entirety. Directional display apparatuses further comprising reflective polarisers arranged between the display polariser and retarders are described in U.S. Patent Publ. No. 2019-0250458, herein incorporated by reference in its entirety. Directional display polarisers comprising passive retarders arranged between a display polariser and an additional polariser are described in U.S. Patent Publ. No. 2018-0321553, herein incorporated by reference in its entirety.

While various embodiments in accordance with the principles disclosed herein have been described above, it should be understood that they have been presented by way of example only, and not limitation. Thus, the breadth and scope of this disclosure should not be limited by any of the above-described exemplary embodiments, but should be defined only in accordance with any claims and their equivalents issuing from this disclosure. Furthermore, the above advantages and features are provided in described embodiments, but shall not limit the application of such issued claims to processes and structures accomplishing any or all of the above advantages.

Additionally, the section headings herein are provided for consistency with the suggestions under 37 CFR 1.77 or otherwise to provide organizational cues. These headings shall not limit or characterize the embodiment(s) set out in any claims that may issue from this disclosure. Specifically and by way of example, although the headings refer to a "Technical Field," the claims should not be limited by the language chosen under this heading to describe the so-called field. Further, a description of a technology in the "Background" is not to be construed as an admission that certain technology is prior art to any embodiment(s) in this disclosure. Neither is the "Summary" to be considered as a characterization of the embodiment(s) set forth in issued claims. Furthermore, any reference in this disclosure to "invention" in the singular should not be used to argue that there is only a single point of novelty in this disclosure. Multiple embodiments may be set forth according to the limitations of the multiple claims issuing from this disclosure, and such claims accordingly define the embodiment(s), and their equivalents, that are protected thereby. In all instances, the scope of such claims shall be considered on their own merits in light of this disclosure, but should not be constrained by the headings set forth herein.

The invention claimed is:

1. A method of controlling reflections of light output from a display device comprising a display panel arranged to output light that has a predetermined polarization state, the method using at least one optical retarder arranged on an output side of the display panel, there being no polariser on an output side of the at least one optical retarder, the method comprising:
defining a first plane of incidence in respect of a first ray of light output from the display device and a first normal to a first surface of optically transmissive material at a first point at which the first ray of light is reflected and a second plane of incidence in respect of a second ray of light output from the display device and a second normal to a second surface of optically transmissive material at a second point at which the second ray of light is reflected; and
selecting the at least one optical retarder, in at least one mode of the at least one optical retarder, to cause the polarization state of the first ray of light to be linearly polarized in a direction that is in the first plane of incidence, and to cause the polarization state of the second ray of light to be linearly polarized in a direction that is in the second plane of incidence.

2. A method according to claim 1, wherein:
the light output from the display panel is linearly polarized in a direction not in the first plane of incidence;
the at least one optical retarder comprises first and second optical retarders, the first and second optical retarders being arranged in any order;
the step of selecting the first optical retarder comprises selecting the first optical retarder to transform the direction of linear polarization of the first ray of light that is present on output from the display panel into the first plane of incidence; and
the step of selecting the second optical retarder comprises selecting the second optical retarder
  to not transform the direction of linear polarization of the first ray of light that is incident thereon, and
  to transform the direction of linear polarization of the second ray of light that is incident thereon into a predetermined direction such that the first and second optical retarders together transform the direction of linear polarization of the second ray of light into the second plane of incidence.

3. A method according to claim 2, wherein:
the second optical retarder is arranged on the output side of the first optical retarder;
the step of selecting the second optical retarder comprises selecting the second optical retarder to not transform the direction of linear polarization of the first ray of light that is present after transformation by the first optical retarder and incident on the second optical retarder; and,
the predetermined direction is in the second plane of incidence.

4. A method according to claim 2, wherein:
the first optical retarder is arranged on the output side of the second optical retarder;
the step of selecting the second optical retarder comprises selecting the second optical retarder to not transform the direction of linear polarization of the first ray of light that is output from the display panel and incident on the second optical retarder; and
the predetermined direction is selected such that the first optical retarder transforms the predetermined direction of linear polarization of the second ray of light that is incident thereon into the second plane of incidence.

5. A method according to claim 2, wherein the first optical retarder has an optical axis parallel to the plane of the first optical retarder.

6. A method according to claim 5, wherein the optical axis of the first optical retarder has a projection onto a plane normal to the first ray of light which bisects (a) the direction of linear polarization of the first ray of light output from the display device and (b) the first plane of incidence.

7. A method according to claim 5, wherein the optical axis of the first optical retarder bisects (a) the direction of linear polarization of a normal ray of light output in a normal direction from the display device and (b) the first plane of incidence.

8. A method according to claim 6, wherein the first optical retarder provides a half-wave retardance at a wavelength of 550 nm along the first ray of light.

9. A method according to claim 2, wherein the second optical retarder has an optical axis which lies at an acute angle to the plane of the second optical retarder and in a plane containing the first ray of light and the direction of polarization of the first ray of light that is incident thereon.

10. A method according to claim 9, wherein the optical axis of the second optical retarder has a projection onto a plane normal to the second ray of light which bisects (a) the direction of linear polarization of the second ray of light that is incident thereon, and (b) the predetermined direction.

11. A method according to claim 10, wherein the second optical retarder provides a half-wave retardance at a wavelength of 550 nm along the second ray of light.

12. A method according to claim 1, wherein the at least one optical retarder comprises first and second optical retarders, the first optical retarder having an optical axis parallel to the plane of the first optical retarder, and the second optical retarder having an optical axis at an acute angle to the plane of the second optical retarder, the first and second optical retarders being arranged in any order.

13. A method according to claim 2, wherein the first optical retarder is a passive retarder and the second optical retarder is an electrically switchable retarder which is switchable between at least two modes.

14. A method according to claim 1, wherein:
the light output from the display panel is linearly polarized in a direction in the first plane of incidence; and
the step of selecting an optical retarder comprises selecting the optical retarder
  to not transform the direction of linear polarization of the first ray of light on output from the display panel, and
  to transform the direction of linear polarization of the second ray of light on output from the display panel into the second plane of incidence.

15. A method according to claim 14, wherein the optical retarder has an optical axis which lies in the first plane of incidence at an acute angle to the plane of the second optical retarder.

16. A method according to claim 15, wherein the optical axis of the second optical retarder has a projection onto a plane normal to the second ray of light which bisects (a) the direction of linear polarization of the second ray of light output from the display device, and (b) the second plane of incidence.

17. A method according to claim 16, wherein the second optical retarder provides a half-wave retardance at a wavelength of 550 nm along the second ray of light.

18. A method according to claim 1, wherein the or each of the at least one optical retarder are passive retarders.

19. A method according to claim 1, wherein the at least one optical retarder includes at least one electrically switchable retarder which is switchable between at least two modes.

20. A method according to claim 1, wherein the first and second rays of light are reflected from the first and second surfaces, respectively, to a common viewing position.

21. A display device comprising:
a display panel arranged to output light that has a predetermined polarization state; and
at least one optical retarder arranged on an output side of the display panel,
wherein, defining a first plane of incidence in respect of a first ray of light output from the display device and a first normal to a first surface of optically transmissive material at a first point at which the first ray of light is reflected and a second plane of incidence in respect of a second ray of light output from the display device and a second normal to a second surface of optically transmissive material at a second point at which the second ray of light is reflected, the at least one optical retarder is selected, there being no polariser on an output side of the at least one optical retarder, in at least one mode of the at least one optical retarder, to cause the polarization state of the first ray of light to be linearly polarized in a direction that is in the first plane of incidence, and to cause the polarization state of the second ray of light to be linearly polarized in a direction that is in the second plane of incidence.

22. An optical arrangement comprising
a display device according to claim 21, and
the first and second surfaces.

23. A vehicle comprising windows and an optical arrangement according to claim 22, wherein the first and second surfaces are surfaces of windows of the vehicle.

* * * * *